(12) United States Patent
Contenti et al.

(10) Patent No.: US 12,256,024 B2
(45) Date of Patent: Mar. 18, 2025

(54) DEVICE PROVISIONING

(71) Applicant: Microsoft Technology Licensing, LLC, Redmond, WA (US)

(72) Inventors: Alessandro Contenti, Clyde Hill, WA (US); Stefan Thom, Snohomish, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 15/629,064

(22) Filed: Jun. 21, 2017

(65) Prior Publication Data

US 2018/0375665 A1   Dec. 27, 2018

(51) Int. Cl.
*H04L 9/32* (2006.01)
*G01G 19/44* (2006.01)
(Continued)

(52) U.S. Cl.
CPC .......... *H04L 9/3263* (2013.01); *G01G 19/44* (2013.01); *H04L 9/14* (2013.01); *H04L 9/30* (2013.01);
(Continued)

(58) Field of Classification Search
CPC ....... H04L 9/3263; H04L 9/14; H04L 9/3247; H04L 9/3226; H04L 9/30; H04L 63/18;
(Continued)

(56) References Cited

U.S. PATENT DOCUMENTS 4,799,258 A   1/1989   Davies
5,343,527 A   8/1994   Moore
(Continued)

FOREIGN PATENT DOCUMENTS

CA   2597209 A1   10/2008
CN   105391840 A   3/2016
(Continued)

OTHER PUBLICATIONS

"Non Final Office Action Issued in U.S. Appl. No. 15/629,139", Mailed Date: Jan. 31, 2019, 10 Pages.
(Continued)

*Primary Examiner* — Shewaye Gelagay
*Assistant Examiner* — Carlton Johnson

(57) ABSTRACT

A device is equipped with a public/private key pair. The private key is stored in a secure location on the device and the public key is utilized to track ownership of the device by a manufacturer, vendor, and/or one or more provisioning services. When a user purchases the device, a transaction involving the public key associated with the device and the user is recorded. The one or more provisioning services, which are provided access to user information, prepare a configuration payload for the device specific to the user and the device. The configuration payload is encrypted using the device's public key. When the device is powered on, the configuration payload is sent to the device. The device decrypts the configuration payload using the device's private key and adjusts one or more configuration parameters based on the configuration payload.

20 Claims, 14 Drawing Sheets

(51) Int. Cl.
*H04L 9/14* (2006.01)
*H04L 9/30* (2006.01)
*H04L 9/40* (2022.01)
*H04W 12/03* (2021.01)
*H04W 12/04* (2021.01)
*H04W 12/30* (2021.01)
*H04W 12/50* (2021.01)
*H04W 4/70* (2018.01)
*H04W 84/12* (2009.01)

(52) U.S. Cl.
CPC .......... *H04L 9/3226* (2013.01); *H04L 9/3247* (2013.01); *H04L 63/0442* (2013.01); *H04W 12/03* (2021.01); *H04W 12/04* (2013.01); *H04W 12/35* (2021.01); *H04W 12/50* (2021.01); *H04L 63/0823* (2013.01); *H04L 63/18* (2013.01); *H04W 4/70* (2018.02); *H04W 84/12* (2013.01)

(58) Field of Classification Search
CPC ... H04L 63/0823; G01G 19/44; H04W 12/04; H04W 12/06; H04W 4/70
See application file for complete search history.

(56) References Cited

U.S. PATENT DOCUMENTS

| | | |
|---|---|---|
| 5,666,414 A | 9/1997 | Micali |
| 5,799,086 A | 8/1998 | Sudia |
| 6,118,874 A | 9/2000 | Okamoto et al. |
| 6,141,423 A | 10/2000 | Fischer |
| 6,253,193 B1 | 6/2001 | Ginter et al. |
| 6,684,330 B1 | 1/2004 | Wack et al. |
| 6,976,163 B1 | 12/2005 | Hind et al. |
| 7,257,844 B2 | 8/2007 | Woodward |
| 7,350,072 B2 | 3/2008 | Zimmer et al. |
| 7,350,083 B2 | 3/2008 | Wells et al. |
| 7,499,551 B1 | 3/2009 | Mire |
| 7,506,381 B2 | 3/2009 | Sormunen et al. |
| 7,580,521 B1 | 8/2009 | Spies et al. |
| 7,711,960 B2 | 5/2010 | Scarlata |
| 8,041,957 B2 | 10/2011 | Michaelis et al. |
| 8,200,988 B2 | 6/2012 | Gass et al. |
| 8,259,948 B2 | 9/2012 | Smith et al. |
| 8,578,153 B2 | 11/2013 | Johansson et al. |
| 8,606,945 B2 | 12/2013 | Merkow et al. |
| 8,621,218 B2 | 12/2013 | Kwon et al. |
| 8,850,543 B2 | 9/2014 | Von Bokern et al. |
| 8,903,370 B2 | 12/2014 | Yerrabommanahalli et al. |
| 9,043,827 B1 | 5/2015 | Rapoport et al. |
| 9,118,486 B2 | 8/2015 | Pritikin |
| 9,235,696 B1* | 1/2016 | Nien ................ G06F 21/313 |
| 9,306,913 B1 | 4/2016 | Volkov |
| 9,419,951 B1 | 8/2016 | Felsher et al. |
| 9,467,293 B1 | 10/2016 | Brainard et al. |
| 10,652,245 B2 | 5/2020 | Brickell |
| 11,374,760 B2 | 6/2022 | Thom et al. |
| 2002/0093915 A1* | 7/2002 | Larson ................ H04L 63/0823 370/252 |
| 2003/0084332 A1 | 5/2003 | Krasinski et al. |
| 2003/0126439 A1 | 7/2003 | Wheeler et al. |
| 2004/0127196 A1 | 7/2004 | Dabbish et al. |
| 2005/0235154 A1 | 10/2005 | Serret-avila |
| 2006/0282901 A1 | 12/2006 | Li et al. |
| 2007/0003064 A1 | 1/2007 | Wiseman et al. |
| 2008/0066095 A1 | 3/2008 | Reinoso |
| 2008/0069350 A1 | 3/2008 | Reinoso et al. |
| 2008/0162947 A1 | 7/2008 | Holtzman et al. |
| 2008/0215474 A1 | 9/2008 | Graham |
| 2009/0044015 A1 | 2/2009 | Gantman et al. |
| 2009/0208015 A1 | 8/2009 | Kamat et al. |
| 2010/0031026 A1 | 2/2010 | Cizas et al. |
| 2010/0266132 A1 | 10/2010 | Bablani et al. |
| 2011/0010770 A1 | 1/2011 | Smith et al. |
| 2011/0179268 A1 | 7/2011 | Strom et al. |
| 2012/0099727 A1 | 4/2012 | Marshall et al. |
| 2012/0137137 A1 | 5/2012 | Brickell et al. |
| 2012/0173885 A1 | 7/2012 | Acar et al. |
| 2012/0255010 A1 | 10/2012 | Sallam |
| 2012/0295618 A1 | 11/2012 | Ahmavaara et al. |
| 2013/0091556 A1 | 4/2013 | Horn et al. |
| 2013/0219166 A1 | 8/2013 | Ristov et al. |
| 2013/0283381 A1 | 10/2013 | Thadikaran et al. |
| 2014/0143412 A1 | 5/2014 | Martinez perea et al. |
| 2014/0281485 A1 | 9/2014 | Ganesan |
| 2015/0003283 A1 | 1/2015 | Previdi et al. |
| 2015/0019875 A1 | 1/2015 | Barbiero et al. |
| 2015/0052064 A1 | 2/2015 | Karpenko et al. |
| 2015/0052610 A1 | 2/2015 | Thom et al. |
| 2015/0073996 A1 | 3/2015 | Makhotin et al. |
| 2015/0074402 A1 | 3/2015 | D'souza et al. |
| 2015/0074764 A1 | 3/2015 | Stern |
| 2015/0113278 A1 | 4/2015 | Cocchi et al. |
| 2015/0149764 A1 | 5/2015 | Charan et al. |
| 2015/0189506 A1 | 7/2015 | Ying et al. |
| 2015/0189509 A1 | 7/2015 | Long et al. |
| 2015/0222517 A1 | 8/2015 | Mclaughlin et al. |
| 2015/0312041 A1 | 10/2015 | Choi |
| 2015/0341791 A1 | 11/2015 | Yang et al. |
| 2016/0021635 A1 | 1/2016 | Lee et al. |
| 2016/0028549 A1 | 1/2016 | Yuji |
| 2016/0044012 A1 | 2/2016 | Carrer et al. |
| 2016/0054989 A1* | 2/2016 | Diebolt ................ H04W 12/04 717/177 |
| 2016/0078251 A1 | 3/2016 | Soja et al. |
| 2016/0099865 A1 | 4/2016 | Klincewicz et al. |
| 2016/0099969 A1 | 4/2016 | Angus et al. |
| 2016/0164883 A1* | 6/2016 | Li ................ H04W 8/205 726/7 |
| 2016/0205078 A1 | 7/2016 | James et al. |
| 2016/0226870 A1 | 8/2016 | Chiu et al. |
| 2016/0270020 A1 | 9/2016 | Adrangi et al. |
| 2016/0285628 A1 | 9/2016 | De et al. |
| 2016/0286392 A1 | 9/2016 | Kanakarajan et al. |
| 2016/0294828 A1 | 10/2016 | Zakaria |
| 2016/0330182 A1 | 11/2016 | Jeon et al. |
| 2016/0342798 A1 | 11/2016 | Smith et al. |
| 2016/0352790 A1* | 12/2016 | Hollingsworth .... H04L 12/1886 |
| 2016/0379220 A1 | 12/2016 | Tunnell et al. |
| 2017/0005871 A1 | 1/2017 | Smith et al. |
| 2017/0006003 A1 | 1/2017 | Zakaria et al. |
| 2017/0024569 A1 | 1/2017 | Xing et al. |
| 2017/0024570 A1 | 1/2017 | Pappachan et al. |
| 2017/0033931 A1 | 2/2017 | Fries et al. |
| 2017/0063566 A1 | 3/2017 | Seminario et al. |
| 2017/0063811 A1 | 3/2017 | Hitchcock et al. |
| 2017/0093868 A1* | 3/2017 | Slavov ................ H04W 4/70 |
| 2017/0142082 A1 | 5/2017 | Qian |
| 2017/0149564 A1 | 5/2017 | Mccallum |
| 2017/0170957 A1 | 6/2017 | Smith et al. |
| 2017/0171158 A1 | 6/2017 | Hoy et al. |
| 2017/0359448 A1 | 12/2017 | Sung et al. |
| 2017/0364908 A1* | 12/2017 | Smith ................ G06Q 20/3827 |
| 2018/0004956 A1 | 1/2018 | Bertorelle |
| 2018/0034642 A1 | 2/2018 | Kaehler |
| 2018/0139228 A1 | 5/2018 | Kanakarajan et al. |
| 2018/0324158 A1 | 11/2018 | Brickell |
| 2018/0373881 A1 | 12/2018 | Thom et al. |
| 2018/0375655 A1 | 12/2018 | Thom et al. |
| 2018/0375852 A1 | 12/2018 | Thom et al. |
| 2019/0052456 A1 | 2/2019 | Bygrave et al. |
| 2019/0081792 A1 | 3/2019 | Thom et al. |
| 2019/0205555 A1 | 7/2019 | Duffy et al. |
| 2022/0407711 A1 | 12/2022 | Thom et al. |

FOREIGN PATENT DOCUMENTS

| | | |
|---|---|---|
| WO | 03098869 A1 | 11/2003 |
| WO | 2016100200 A1 | 6/2016 |

(56) References Cited

FOREIGN PATENT DOCUMENTS

| WO | 2016172492 A1 | 10/2016 |
|---|---|---|
| WO | 2016200597 A1 | 12/2016 |

OTHER PUBLICATIONS

"Non Final Office Action Issued in U.S. Appl. No. 15/629,114", Mailed Date: Feb. 26, 2019, 10 Pages.
"AllJoyn™ Security 2.0 Feature High-Level Design", Retrieved from: https://web.archive.org/web/20170730231028/https:// allseenalliance.org/framework/documentation/learn/core/security2_ 0/hld, Aug. 29, 2017, 53 Pages.
"Device Pairing Kinds Enum", Retrieved from: https://docs.microsoft. com/en-us/uwp/api/windows.devices.enumeration. devicepairingkinds, Aug. 29, 2017, 2 Pages.
"OCF Security Specification V1.0.0", Retrieved from: https:// openconnectivity.org/draftspecs/OCF_Security_Specification_v1.0. 0.pdf, Aug. 29, 2017, 104 Pages.
"TCG Infrastructure Working Group Reference Architecture for Interoperability (Part 1)", Retrieved From: https://trustedcomputing-group.org/wp-content/uploads/IWG_Architecture_v1_0_r1.pdf, Jun. 16, 2005, 66 Pages.
Abelson, et al., "The Risks of Key Recovery, Key Escrow, and Trusted Third-Party Encryption", In World Wide Web Journal—Special Issue: Web Security: a Matter of Trust, vol. 2, Issue 3, Jun. 1, 1997, 20 Pages.
Feller, Thomas, "Towards Trustworthy Cyber-Physical Systems", In Publication of Springer, Aug. 25, 2014, 2 Pages.
Gallery, et al., "Trusted Mobile Platforms", In Proceedings of the Foundations of Security Analysis and Design IV, Aug. 18, 2007, 43 Pages.
Hu, Fei, "Wireless Embedded Microsystems", In Publication of CRC Press, Sep. 26, 2013, 1 Page.
Konstantinou, et al., "Cyber-Physical Systems: a Security Perspective", In Proceedings of 20th IEEE European Test Symposium, May 25, 2015, 8 Pages.
"International Search Report and Written Opinion Issued in PCT Application No. PCT/US18/033578", Mailed Date: Jul. 31, 2018, 12 Pages.
"International Search Report and Written Opinion Issued in PCT Application No. PCT/US18/033579", Mailed Date: Jul. 24, 2018, 14 Pages.
"International Search Report and Written Opinion Issued in PCT Application No. PCT/US18/033580", Mailed Date: Jul. 30, 2018, 12 Pages.
"International Search Report and Written Opinion Issued in PCT Application No. PCT/US18/033581", Mailed Date: Aug. 23, 2018, 12 Pages.
"International Search Report and Written Opinion Issued in PCT Application No. PCT/US18/038868", Mailed Date: Aug. 17, 2018, 12 Pages.
Green, Matthew, "Multiple encryption", https://blog. cryptographyengineering.com/2012/02/02/multiple-encryption/, Published on: Feb. 2, 2012, 6 pages.
Arthur et al., "A Practical Guide to TPM 2.0, Using the Trusted Platform Module in the New Age of Security", In Master Security Concepts Using TPM 2.0, Aspress Open, Originally published on Jan. 24, 2015, 375 pages.
Wang, Yingmei, "Middleware Technology Research and Interface Design Based on Internet of Things", In International Journal of Smart Home, vol. 9, No. 12, Dec. 30, 2015, pp. 35-44.
Does F-Secure KEY use double encryption to protect my KEY data?, https://community.f-secure.com/t5/F-Secure-KEY/Does-F-Secure-KEY-use-double/ta-p/80971, Retrieved on: Apr. 18, 2017, 2 pages.
"Non Final Office Action Issued in U.S. Appl. No. 15/629,086", Mailed Date: Apr. 5, 2019, 14 Pages.
"Final Office Action Issued in U.S. Appl. No. 15/629,114", Mailed Date: May 30, 2019, 12 Pages.
"Non Final Office Action Issued in U.S. Appl. No. 15/703,857", Mailed Date: May 29, 2019, 13 Pages.
"Final Office Action Issued in U.S. Appl. No. 15/629,086", Mailed Date: Sep. 30, 2019, 14 Pages.
"Non Final Office Action Issued in U.S. Appl. No. 15/703,857", Mailed Date: Sep. 21, 2021, 20 Pages.
"Office Action Issued in European Patent Application No. 18732525. 3", Mailed Date: Oct. 18, 2021, 4 Pages.
"Second Office Action Issued in Chinese Patent Application No. 201880041786.8", Mailed Date: Aug. 10, 2022, 22 Pages.
"Notice of Allowance Issued in U.S. Appl. No. 15/703,857", Mailed Date : Feb. 23, 2022, 19 Pages.
"Office Action Issued in Indian Patent Application No. 201947046469", Mailed Date: Feb. 25, 2022, 6 Pages.
"First Office Action and Search Report Issued in Chinese Patent Application No. 201880041786.8", Mailed Date: Dec. 22, 2021, 11 Pages.
"Notice of Allowance Issued in European Patent Application No. 18731598.1", Mailed Date: Mar. 20, 2023, 8 Pages.
"Non Final Office Action Issued in U.S. Appl. No. 17/664,908", Mailed Date: Jan. 19, 2023, 31 Pages.
"Third Office Action Issued in Chinese Patent Application No. 201880041786.8", Mailed Date: Dec. 23, 2022, 9 Pages.
"Office Action Issued in European Patent Application No. 18731598. 1", Mailed Date: Dec. 16, 2021, 6 Pages.
"Notice of Allowance Issued in Chinese Patent Application No. 201880041786.8", Mailed Date: Mar. 4, 2023, 4 Pages.
"Notice of Allowance Issued in European Patent Application No. 18731598.1", Mailed Date: Jul. 27, 2023, 2 Pages.
"Notice of Allowance Issued in U.S. Appl. No. 17/664,908", Mailed Date: Jun. 5, 2023, 26 Pages.
"Final Office Action Issued in U.S. Appl. No. 15/703,857", Mailed Date: Aug. 6, 2020, 18 Pages.
"Notice of Allowance Issued in European Patent Application No. 18732525.3", Mailed Date: Oct. 17, 2023, 8 Pages.
"Notice of Allowance Issued in U.S. Appl. No. 15/629,086", Mailed Date: Sep. 25, 2020, 13 Pages.
Fotiou, et al., "Securing Content Sharing over ICN", In Proceedings of the 3rd ACM Conference on Information-Centric Networking, Sep. 26, 2016, pp. 176-185.
Communication 71(3) Received for European Application No. 18732525.3, mailed on. Jan. 23, 2024, 9 pages.
"Non-Final Office Action Issued in U.S. Appl. No. 15/629,086", Mailed Date: Mar. 19, 2020, 17 Pages.
"Non Final Office Action Issued in U.S. Appl. No. 15/703,857", Mailed Date: Mar. 18, 2020, 17 Pages.

\* cited by examiner

DEVICE PROVISIONING

BACKGROUND

Consumer devices are increasingly configured with sensors, electronics, and networking capabilities to provide enhanced user experiences. For example, household devices, such as smart appliances, can be configured to connect to a local area network (LAN) (e.g., Ethernet or Wi-Fi) to upload and download user data, download software and firmware updates, etc. Such connectivity further allows some devices to be sensed or controlled remotely. Such devices are sometimes referred to as "connected devices," "smart devices," or an "Internet of Things (IoT)" devices. When a user purchases an IoT device, the user generally configures the device to connect to the user's home or work LAN using a user interface built into the device or a mobile, desktop, or web application that is operable to configurably connect to the device, etc.

SUMMARY

In at least one implementation, a device includes a configuration interface configured to communicate a public device ID to a provisioning service. The public device ID is cryptographically associated with a private key securely stored in the device. The public device ID is employed to access an ownership record identifying a user as owner of the device. One or more device and user specific device configuration parameters are stored in association with the ownership record. The device further includes a payload manager configured to receive an encrypted configuration payload from the provisioning service. The configuration payload contains the one or more device configuration parameters specific to the user and the device. The encrypted configuration payload is encrypted using the public device ID cryptographically associated with the private key stored in the device. The device further includes a decryption engine configured to decrypt the encrypted configuration payload using the private key securely stored on the device. The device further includes a device configuration manager to configure the device according to the one or more device configuration parameters received in the configuration payload.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
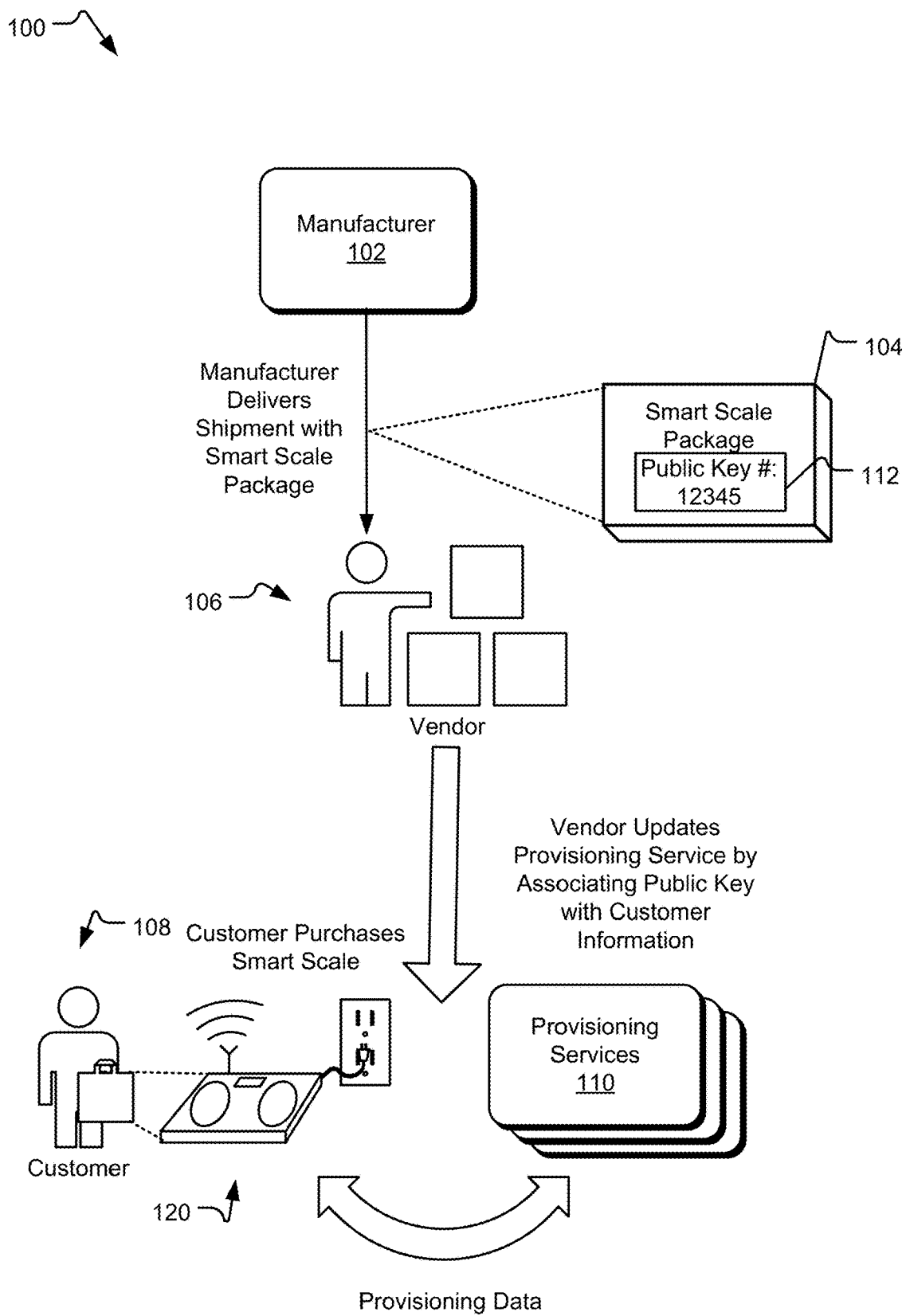
FIG. 1 illustrates an example functional block diagram for provisioning a device.

Consumer devices are increasingly configured with sensors, electronics, and networking capabilities to provide enhanced user experiences. User intervention is generally required to setup such devices. (e.g., Internet of Things (IoT) devices, smart devices, or connected devices). For example, if a user wants to connect a smart scale to the user's health account in the cloud, the user can employ a smart phone application (or a desktop/web application) that connects to the device to enter the user's account information. Similarly, to connect a Wi-Fi enabled printer to a user's Wi-Fi channel, the user may employ a cumbersome user interface built into the printer to enter the user's Wi-Fi SSID and password. Providing user interfaces or connectable applications for different types of smart devices is expensive for manufacturers or is generally not user friendly. Furthermore, such implementations may not be secure against nefarious actors, such as hackers, who may be able to connect to the user's Wi-Fi, spoof a smart device, capture user data, etc.

The implementations described herein provides technology and methodology for secure and user friendly device configuration. Such configuration for such a device includes network setup (e.g., providing Wi-Fi SSID/password information), initializing user account information on the devices, installation of user applications, installation of firmware/software updates, etc. and is hereinafter referred to as "device provisioning." A manufactured device is equipped with a public/private key pair, such as a public/private key pair utilized in public key infrastructure (PKI). The public/private key pair is generated in a secure location within the device, such as in a trusted execution environment (TEE) or a trusted platform module (TPM). The public key is utilized as a cryptographic, globally unique, public device identification (ID).

As the devices are manufactured and public/private key pairs are implemented for each device, the public keys are recorded by the manufacturer or one or more provisioning services. The record is subsequently utilized by different parties as an ownership record. For example, when a vendor purchases an arbitrary number of devices from the manufacturer, the public keys associated with the arbitrary number of devices are associated with the purchasing vendor within a device tracking database. In other words, a transaction is recorded in association with the public keys. Furthermore, the public keys may be printed on the physical package that contains the manufactured device. As such, upon delivery of the devices from the manufacturer to the vendor, the vendor scans the public keys on the printed package to confirm delivery of the devices. Thus, the public keys, along with shrink-wrap, are utilized to confirm secure delivery of the devices from the manufacturer to the vendor.

One or more provisioning services, which may be implemented by the manufacturer, vendor, or may be a stand-alone service that employs user information and the public keys associated with devices to provision the devices when the devices are purchased. For example, a vendor, such as an electronics store, implements or employs a provisioning service. The provisioning service manages or has access to customer account information. For example, a user has a customer account with the electronics store (e.g., via a rewards program). The user is able to connect other accounts and services to the customer account. Such other accounts may include, without limitation, service subscriptions (e.g., a health tracking service), social media accounts, etc. Furthermore, the user submits SSID/password information for the user's home LAN to the customer account. As such, when the user purchases a smart device at the vendor, the public device ID (public key) is associated to the user's account in an ownership record. In other words, a transaction involving the user and the device associated with the public key is recorded with the provisioning service.

The provisioning service prepares configuration payloads for the device based on the customer's account information. The configuration payloads may include the customer's SSID/password for the user's Wi-Fi, software/firmware updates, applications, user data, etc. The configuration payloads are encrypted using the purchased device's public key.

At the customer's residence, the customer has a router equipped with device provisioning technology. The router (or a connected device) provides wireless access to a constrained provisioning channel, which may be hidden. The device is equipped with provisioning channel information, such as the SSID for the constrained provisioning channel (e.g., a provisioning channel ID). When the device is powered on at the customer's residence (or place of employment), the device connects to the constrained provisioning channel using the provisioning channel SSID stored in the device. The constrained provisioning channel is configured to communicate with one or more provisioning services. The device communicates the device ID to the provisioning service via the provisioning channel. The provisioning service confirms ownership of the device using the public device ID and transmits the encrypted configuration payload to the device via the constrained provisioning channel. The device decrypts the configuration payload using the private key associated with the public device ID and configures the device based on configuration parameters within the payload. In some implementations, the initial configuration payload communicated via the provisioning channel includes Wi-Fi SSID/password information for the customer's LAN (also referred to as "Wi-Fi channel connection parameters"), the device adjusts one or more parameters on the device such that the device connects to customer's LAN channel. When the device is connected to the customer's LAN, it can download additional configuration payloads, user data, etc.

Accordingly, the public key associated with the device is utilized to track ownership of the device (via an ownership record accessible by the provisioning service) and to prepare configuration payloads for devices upon transfer of a device to a customer. Furthermore, the public device ID and provisioning service is utilized to deprovision and reprovision the device for another customer. Because the configuration payloads are encrypted using the public key associated with the device storing the private key, the devices are prevented from being spoofed. These and other implementations are described below with reference to the figures.

FIG. 1 illustrates an example functional block diagram 100 for provisioning a device. The block diagram 100 includes a manufacturer 102, vendor 106, a customer 108 and provisioning services 110. The manufacturer 102 manufactures one or more smart device. Example smart devices include, without limitations, smart appliances (e.g., refrigerators, stoves, ovens, scales, washers, dryers, toasters, blenders, coffee makers, juicers), smart light bulbs, smart electrical plugs, entertainment systems, security systems, smart thermostats, etc. Such devices are configured to connect to one or more networks, such as an internet, intranet, local area network (LAN), wide area network (WAN), cellular network (e.g., 3G, 4G, LTE), one or more other devices, etc. for downloading software and firmware updates, downloading/uploading user data, customization, communications, etc. In the illustrated functional block diagram 100, the manufacturer 102 manufactures smart weight scale devices, but it should be understood that the described implementations are extendable to a variety of smart assets. Furthermore, the process illustrated in the functional block diagram 100 is described with respect to the parties (the manufacturer 102, the vendor 106, the provisioning services 110, and the customer 108) performing different actions. However, it should be understood that the processes described may be automated.

The manufacturer 102 issues one or more digital certificates to a device that are signed by a certificate authority (CA), which may be the manufacturer 102 or a CA employed by the manufacturer 102. The certificates are signed using the CA's root of trust, which is a public key portion of a public/private key pair associated with the CA. Because the certificates are signed by the CA's root of trust, the certificates can be trusted by other devices or services communicating with the device. The CA's root of trust may be stored in read only memory (ROM) or write once, read many memory (WORM) that is accessible by a trusted execution environment (TEE) of the device. The certificates can include one or more keys that may be utilized for different purposes, such as encryption/decryption, secure communication sessions (e.g., SSL, TLS), endorsement, attestation, and authentication. For at least one of the one or more issued certificates, a public/private key pair is generated and signed with the root of trust. The different types of keys (e.g., the public/private key pair) may be generated using the root of trust in the TEE. The public key of the public/private key pair is utilized as cryptographic, globally unique device identification (ID). The private key is stored in a trusted platform module (TPM) of the device. The manufacturer 102 documents each public key and associates the public key with the respective devices in an ownership record. The smart scale 120 may utilize other cryptographic algorithms and functionality. For example, the device may utilize hashing algorithms (e.g., SHA-3, MD5) for confirming integrity of received payloads.

Furthermore, the manufacturer 102 can print the public key on the package of each device. For example, a smart scale package 104 contains a smart scale 120 associated with a public key 112 (12345), which is printed on the smart scale package 104. It should be understood that the public key 112 may be printed via bar code, QR code, etc. The smart scale 120 in the smart scale package 104 securely stores, within a TPM of the smart scale 120, a private key associated with the public key.

As the manufacturer 102 builds the devices, the manufacturer 102 stores and documents all public keys of the public/private key pairs associated with each device. Such documentation may include associating the public key with an owner of the associated device in an ownership record. The ownership record may be a database, cloud server, distributed database (e.g., blockchain), etc. As such, the public key acts as a cryptographic, globally unique device identification that is used to track ownership of the device. At this point in the illustrated process, the manufacturer 102 is the owner of the scales. When a vendor (e.g., the vendor 106) orders an arbitrary number of smart scales. The manufacturer associates the arbitrary number of public keys with the vendor 106. Such association may include updating a database, recording a transaction, etc. in the ownership record. The manufacturer 102 delivers a shipment of the arbitrary number of smart scales to the vendor 106. The shipment includes the smart scale package 104 (with the smart scale 120 storing a private key associated with the public key 12345). The vendor 106 receives a listing of smart scales as a list of public keys associated with each smart scale. When the vendor 106 receives the shipment, the vendor 106 checks (e.g., scans) each public key to confirm that the ordered scales are delivered.

The vendor 106 is any type of merchant that sells smart devices to companies, individuals, etc. Example vendors include, without limitation, an online shopping services, an electronics store, etc. One or more provisioning services 110 are utilized by the vendor 106 and/or the manufacturer 102 to track ownership (e.g., via the public keys and the ownership record) of the devices and to provide provisioning services to users of the devices. Example provisioning services include, without limitation, initial device setup, firmware/software updates, application installation and updates, user data tracking and updates, etc. The provisioning services may be provided by the vendor 106, the manufacturer 102, or may be a stand-alone provisioning service employed by the manufacturer 102, the vendor 106 and/or the customer 108.

In the illustrated example, the customer 108 purchases the smart scale 120 identified by the public key 112 in the smart scale package 104, At which point, ownership of the smart scale 120 is transferred to the customer 108 via associating the public key 112 with the customer 108 in an ownership record accessible by the provisioning services 110. For example, if the customer 108 purchases the smart scale 120 at an electronics store, the cashier at the electronics store associates the public key 112 to the customer, who may have a customer account. The customer account may have been previously submitted or created for a rewards program, gift card, etc. As such, the cashier may ask for user information (e.g., a phone number) to load (at the cash register) the customer account associated with the customer 108. The cashier scans the public key to associate the public key with the customer account of the customer 108. In this example, ownership is thereby transferred to the customer 108 and recorded in the ownership record. The account information is stored/managed by one of the provisioning services 110, which may be associated with/managed by the vendor 106 or the manufacturer 102. In another example purchasing scenario, the user purchases the smart scale 120 at on online retailer. The customer 108 is logged into the customer account associated with the customer 108 when the purchase is made. The online retailer associates the public key 112 with the customer account of the customer 108. In the above described example, the account information of the customer 108 is linked to one or more of the provisioning services, which may be managed by the vendor 106 and/or the manufacturer or may be a stand-alone service.

Because the customer 108 has account information linked to one or more of the provisioning services 110 and ownership of the smart scale 120 is tracked by the one or more of the provisioning services 110 in an ownership record, the provisioning services 110 configures the smart scale 120 for the customer 108 based on customer preferences, account information, etc. stored in association with the ownership record. Example configuring includes packaging software/firmware updates, configuration information, etc. for transmission to the smart scale 120. For example, the customer 108 prepays for a software upgrade, such as body mass index (BMI) tracking. As such, the provisioning services 110 packages the BMI tracking software for loading to the smart scale 120 when the smart scale 120 connects to the provisioning service.

In some example implementations, the smart scale 120 is configured to receive initial configuration information from the provisioning services 110 via a constrained provisioning channel when the smart scale 120 is powered on for the first time. The smart scale 120 is preconfigured with connection parameters (e.g., SSID/password information) for the provisioning channel. When the smart scale 120 is powered on, the smart scale connects to the provisioning channel and communicates with the provisioning services 110. The smart scale 120 communicates the public key 112 to the provisioning services 110 via the provisioning channel. The provisioning service confirms ownership of the smart scale 120 using the public device ID and 1614 sends an encrypted configuration payload that includes minimal connection information containing one or more device configuration parameters for connecting the device to a Wi-Fi channel of the customer 108. The device connects to the Wi-Fi channel of the customer using the device configuration parameters. After the smart scale 120 connects to the Wi-Fi channel, the smart scale 120 may receive additional data and software (e.g., large software/firmware updates, user data, user applications) from the provisioning services 110.

The packaged software/firmware updates and/or configuration information (collectively "payloads") for the customer 108 and the smart scale 120 are encrypted using the public key 112 associated with the smart scale 120. Accordingly, when the smart scale 120 is eventually connected to the network, the smart scale 120 communicates the public key 112 to one or more of the provisioning services 110. In response, the provisioning services 110 pushes an encrypted payload to the smart scale 120. The smart scale 120 decrypts the payload using the private key stored on the smart scale 120 installs the updates or stores the data specific for the customer and device.

The use of the public/private key pair in such devices provides a number of benefits. The public key is used to track ownership of the device from the manufacturer 102 to the vendor 106 to the customer 108. In other words, each transaction for a device is recorded by re-associating the public key with the next party in the transaction chain. Furthermore, because the device includes a private key, correct ownership is established. For example, if a device is stolen or illegally sold (e.g., from a delivery truck), the "transaction" (e.g., an update to the public key) is not recorded. Accordingly, when the device is eventually connected to the network and attempts communication with one of the provisioning services 110, the provisioning services 110 detects that ownership has not been transferred. In response, the provisioning service 110 may take secure action by locking (e.g. bricking) the device with an update such that the unauthorized party is unable to use the device.

Furthermore, utilization of the public/private key pair prevents a device from being "spoofed." For example, if a party tries to utilize a public key on a device without the associated private key, the device will not be able to decrypt a payload sent to the device. In other words, the ability to decrypt a payload sent to a device directly confirms the device's authorization to use the software/firmware updated and/or configuration information sent to the device.

In some example implementations, the provisioning services 110 can share an ownership record database or data store for the devices. Accordingly, a user can selectively utilize any one or more of the provisioning services 110 for device tracking, user customization, etc. Accordingly, the provisioning services 110 have access privileges to the ownership record to update ownership information for public keys associated with devices. A user is also able to link different types of accounts to the provisioning services 110. For example, the customer 108 links social media accounts one of the provisioning services 110 that is connected to the purchased smart scale 120. Accordingly, the provisioning services 110 are able to post a social media update when a weight loss goal is reached. Similarly, health tracking accounts may be linked to provisioning services that manage one or more user devices. For example, a smart refrigerator, toaster, blender, and scale may be linked to provisioning services 110 that have access to a health account information for tracking/updating user action. In some example implementations, device functionality may be limited by the provisioning services 110 and/or the device based on the purchase. For example, if the smart device is a smart storage device (e.g., an external solid state storage drive), the device may include 5 terabytes of storage. However, the customer 108 purchases 3 TB of storage when the device is purchased. As such, a configuration payload for the device includes configuration information that allows the user to use 3 TB of the 5 TB total for the device. The customer 108 may "upgrade" at a later time, and the provisioning services 110 prepares a configuration payload to unlock the additional 2 TB of storage. Additional functionality limitations are contemplated.

Figure 2:
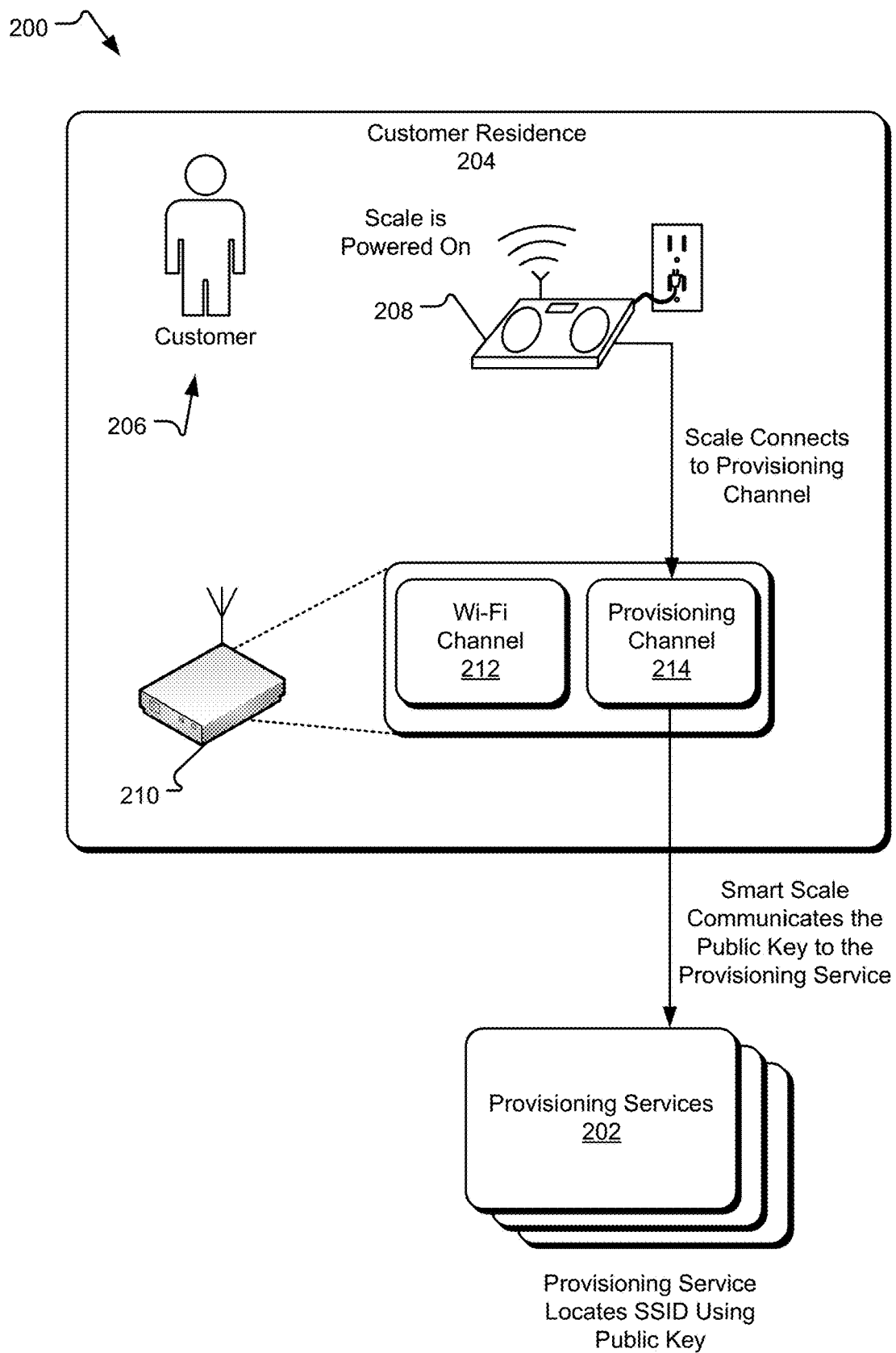
FIG. 2 illustrates another example functional block diagram for provisioning a device.

FIG. 2 illustrates another example functional block diagram 200 for provisioning a device. In FIG. 2, a customer 206 has purchased a smart scale 208 that is associated with public key (not shown). When the customer 206 purchased the smart scale 208, the public key associated with the smart scale is associated with a customer profile of the customer 206 in an ownership record accessible by one or more provisioning services 202. In effect, ownership of the smart scale 208 is transferred to the customer 206 when the public key associated with the smart scale is associated to the customer profile. Because one or more of the provisioning services 202 (hereinafter "the provisioning service 202") have knowledge of the ownership transfer to the customer 206, the provisioning service 202 can pre-prepare a configuration payload for the smart scale tailored for the customer 206. An initial configuration payload may include the Wi-Fi channel connection information for a residence 204 of the customer 206. Subsequent configuration payloads may include user data, applications, software/firmware updates, etc.

The residence 204 of the customer 206 includes a local area network accessible via a router 210, for example. The router 210 includes a Wi-Fi channel 212 and a provisioning channel 214. The Wi-Fi channel is a channel configured by the customer 206 to provide access to the internet for devices of the user. For example, the customer 206 may connect to the Wi-Fi channel 212 using a laptop, desktop, tablet, mobile device, gaming device etc. It should be understood that other LAN/WAN configurations are contemplated.

When the smart scale 208 is powered on for the first time, the smart scale 208 is not configured to connect to the Wi-Fi channel 212 of the customer 206 because the Wi-Fi channel 212 is protected by a SSID/password combination. The smart scale 208 is preconfigured with a SSID or other channel identification for the provisioning channel 214. As such, when the smart scale 208 is powered on for the first time, the smart scale searches for the preloaded SSID for the provisioning channel 214. If the provisioning channel 214 is located by the smart scale 208, the smart scale 208 connects to the provisioning channel 214. The smart scale 208 then communicates the public key associated with the smart scale 208 to the provisioning service 202 via the provisioning channel 214. Because the provisioning service 202 has pre-prepared a configuration payload for the customer 206 based on the public key associated with the smart scale 208, the provisioning service 202 transmits the encrypted configuration payload to the smart scale 208. The configuration payload includes configuration information (e.g., SSID and password) to connect to the Wi-Fi channel 212, which is not constrained relative to the provisioning channel 214. As such, the smart scale 208 decrypts that configuration payload, configures one or more device parameters based on the configuration payload (e.g., Wi-Fi channel 212 configuration information), connects to the Wi-Fi channel 212, and then receives larger additional configuration payloads, which may include firmware updates, applications, user data, etc.

The provisioning channel 214 is a constrained wired or wireless channel that is configured for smart device provisioning. The provisioning channel 214 is provided by the router 210, by a separate router (not shown), by a router plugin (e.g., a dongle), or another device. The provisioning channel 214 is constrained to be connected to one or more destinations (e.g., the provisioning services 202) and may be constrained by bandwidth, frequency speed, rate, etc. Furthermore, the provisioning channel 214 may be a hidden channel that is accessible by devices that are preconfigured with information regarding the hidden channel.

In some example implementations, a customer can connect the smart scale 208 to the router 210 or a modem (not shown) using a mobile, desktop, or web application, a user interface built into the device, and/or directly connects the smart scale 208 using an Ethernet, USB, etc. connection. In such implementations, the smart scale 208 communicates the public key to the provisioning service 202. The provisioning service 202 transmits the encrypted configuration payload to the smart scale 208. The smart scale 208 decrypts the configuration payload with the private key associated with the public key and configures one or more device parameters based on the configuration payload.

Figure 3:
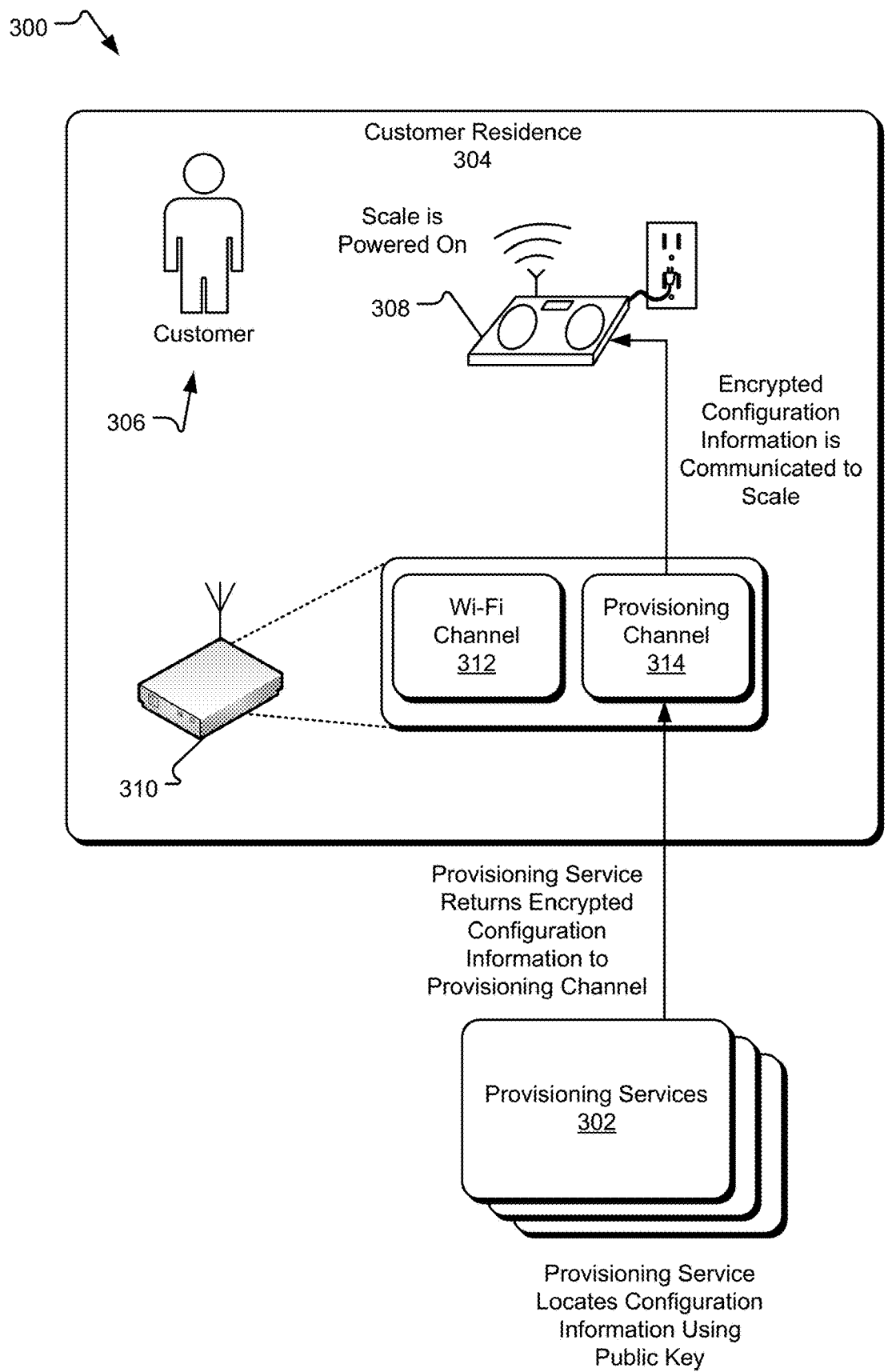
FIG. 3 illustrates another example functional block diagram for provisioning a device.

FIG. 3 illustrates another example functional block diagram 300 for provisioning a device. The functional block diagram 300 includes provisioning services 302 (hereinafter "the provisioning service 302"), a customer residence 304 with a customer 306, a router 310, and a smart scale 308. The customer 306 has powered on the smart scale 308, which connected to a provisioning channel 314 of the router 310. The router further includes a Wi-Fi channel 312, which the smart scale 308 is not yet provisioned for (e.g., the smart scale 308 is not configured with configuration parameters for the Wi-Fi channel 312). The smart scale 308 communicated its public key (e.g., public device ID) to the provisioning service 302 via the provisioning channel 314. The provisioning service 302 locates the pre-prepared configuration payload using the public key and encrypts the configuration payload (or the configuration payload may have been previously encrypted) using the public key. The provisioning service 302 communicates the encrypted configuration payload to the smart scale 308 via the provisioning channel 314. The configuration payload includes parameters for connecting the smart scale 308 to the Wi-Fi channel 312. Thus, the smart scale 308 can use the parameters to connect to the Wi-Fi channel 312 to receive subsequent configuration payloads including software/firmware updates, user data, user applications, etc.

Figure 4:
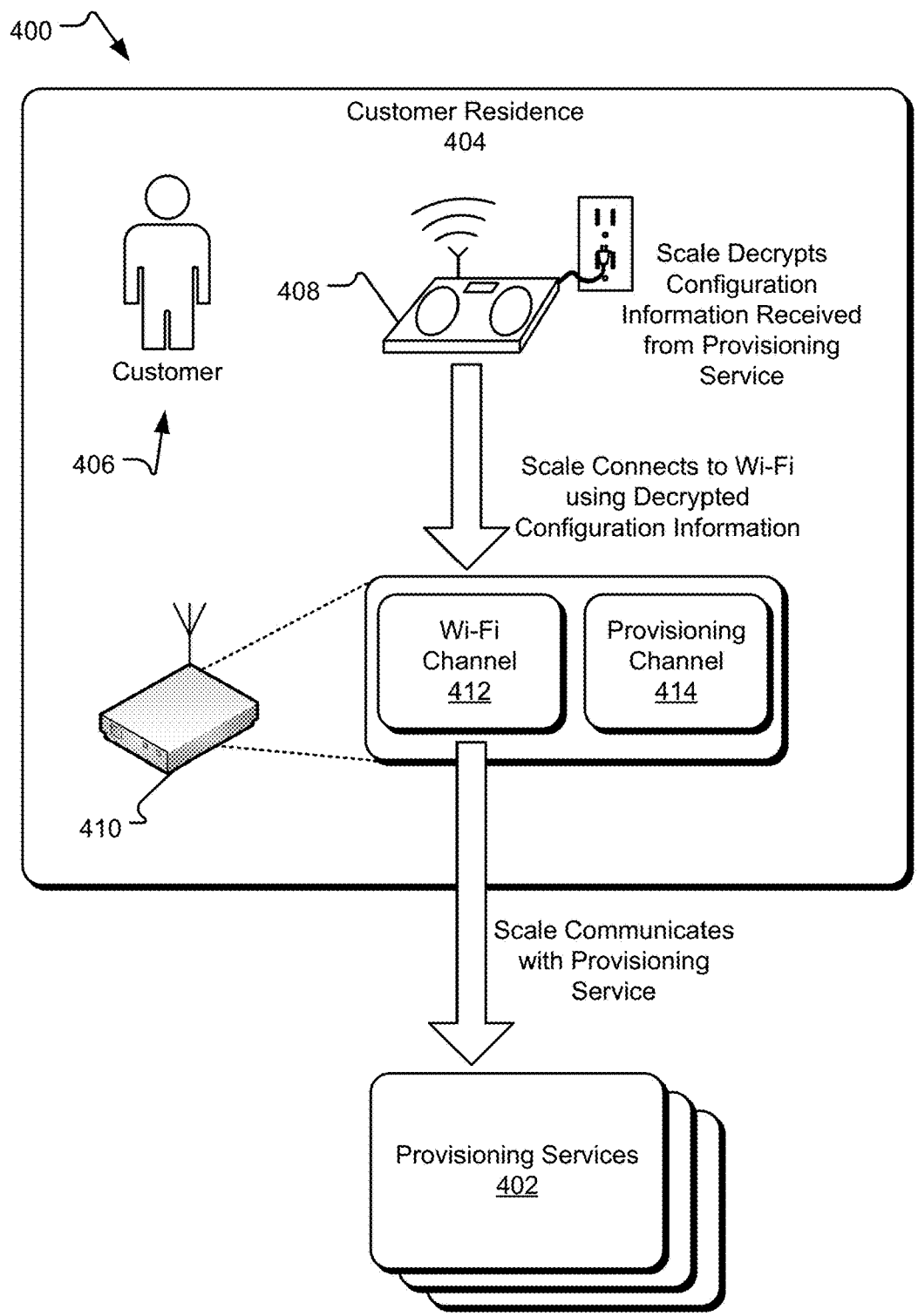
FIG. 4 illustrates another example functional block diagram for provisioning a device.

FIG. 4 illustrates another example functional block diagram 400 for provisioning a device. The functional block diagram 400 includes provisioning services 402 (hereinafter "the provisioning service 402"), a customer residence 404 with a customer 406, a router 410, and a smart scale 408. The customer 406 has powered on the smart scale 408, which connected to a provisioning channel 414 of the router 410. The smart scale 408 communicated its public key (e.g., public device ID) to the provisioning service 402 via the provisioning channel 414. The provisioning service 402 located the pre-prepared configuration payload using the public key, encrypted the configuration payload (or the configuration payload may have been previously encrypted) using the public key. The provisioning service 402 communicated the encrypted configuration payload to the smart scale 408 via the provisioning channel 414.

The smart scale 408 decrypts the configuration payload received from the provisioning service 402 using the private key associated with the public key. In this example implementation, the configuration payload includes device configuration parameters for connecting to the Wi-Fi channel 412 of the router 410. The smart scale uses the device configuration parameters to connect to the Wi-Fi channel 412 and communicate with the provisioning service 402. The provisioning service 402 packages (or has already pre-packaged) additional configuration packages including software/firmware updates, configuration information, user data, applications, etc., encrypts the payload, and communicates the payload to the smart scale 408. In implementations where the configuration information includes the Wi-Fi channel 412 information, it should be understood that the customer 406 has provided, to the provisioning service 402, the Wi-Fi information via a user account that is managed or is accessible by the provisioning service 402. As such, additional devices purchased by the customer 406 are similarly provided such information via the provisioning channel 414.

Figure 5:
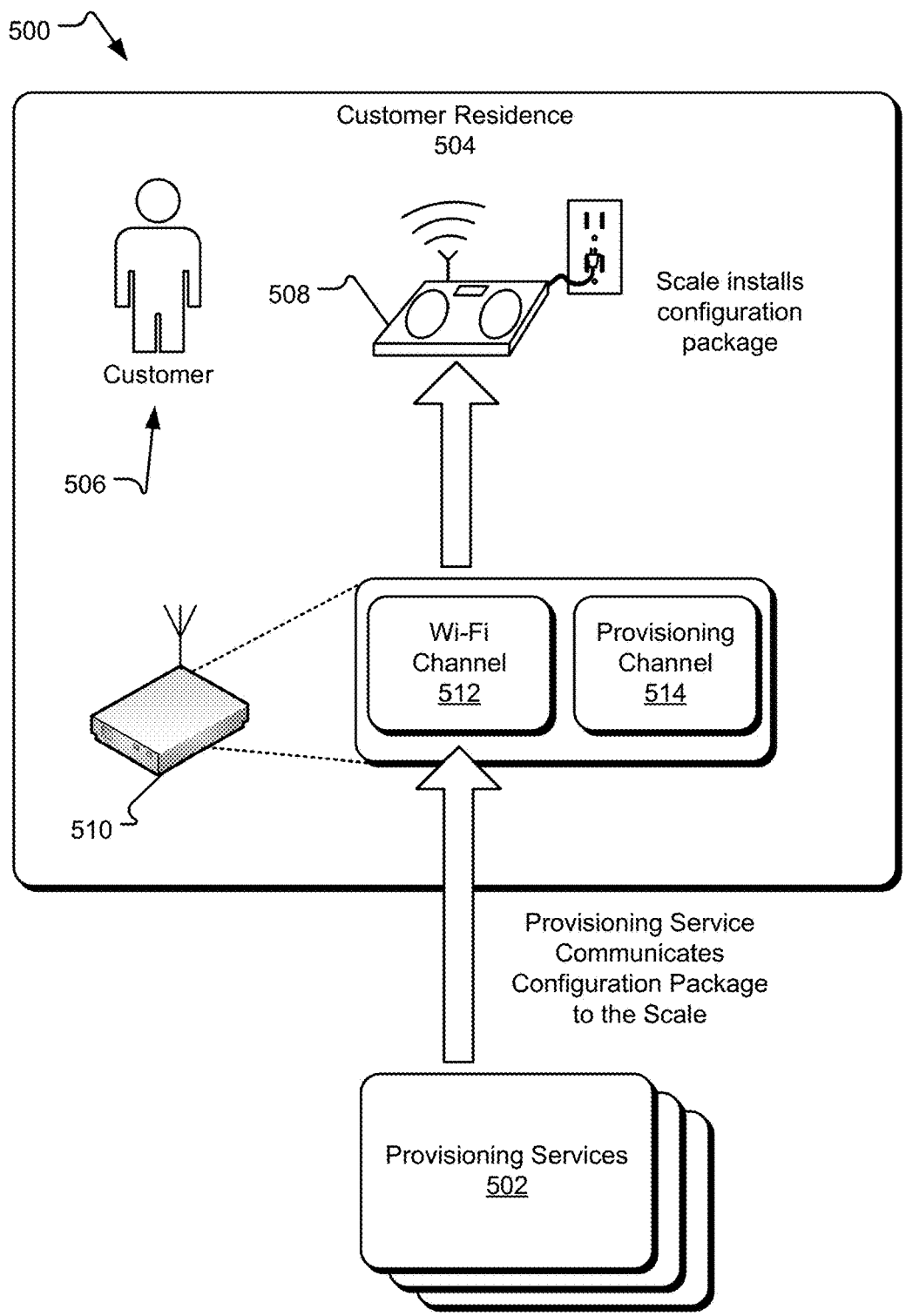
FIG. 5 illustrates another example functional block diagram for provisioning a device

FIG. 5 illustrates another example functional block diagram 500 for provisioning a device. The functional block diagram 500 includes provisioning services 502 (hereinafter "the provisioning service 502"), a customer residence 504 with a customer 506, a router 510, and a smart scale 508. The customer 506 has powered on the smart scale 508, which connected to a provisioning channel 514 of the router 510. The smart scale 508 communicated its public key (e.g., public device ID) to the provisioning service 502. The provisioning service 502 located the pre-prepared configuration payload using the public key, encrypted the configuration payload (or the configuration payload may have been previously encrypted) using the public key. The provisioning service 502 communicated the encrypted configuration payload to the smart scale 508 via the provisioning channel 514. The smart scale 508 decrypts the encrypted configuration payload using the private key stored on the smart scale 508 and uses the configuration information to connect to the Wi-Fi channel 512 and communicate with the provisioning service 502.

In FIG. 5, the provisioning service 502 communicates additional configuration payloads, which may include software/firmware updates, user data, etc. to the smart scale 508. Such additional configuration payloads are sometimes specific to the customer 506 based on a customer profile associated with the customer 506 and stored in an ownership record accessible by the provisioning service 502. Because the smart scale 508 is connected to the Wi-Fi channel 512, the smart scale 508 intermittently uploads user data to the provisioning service 502, downloads firmware updates from the provisioning service 502, etc. The user data (such as weight measurements) uploaded to the provisioning service 502 may be connected to a health account information accessible by the provisioning service 502 and usable by other smart devices.

Figure 6:
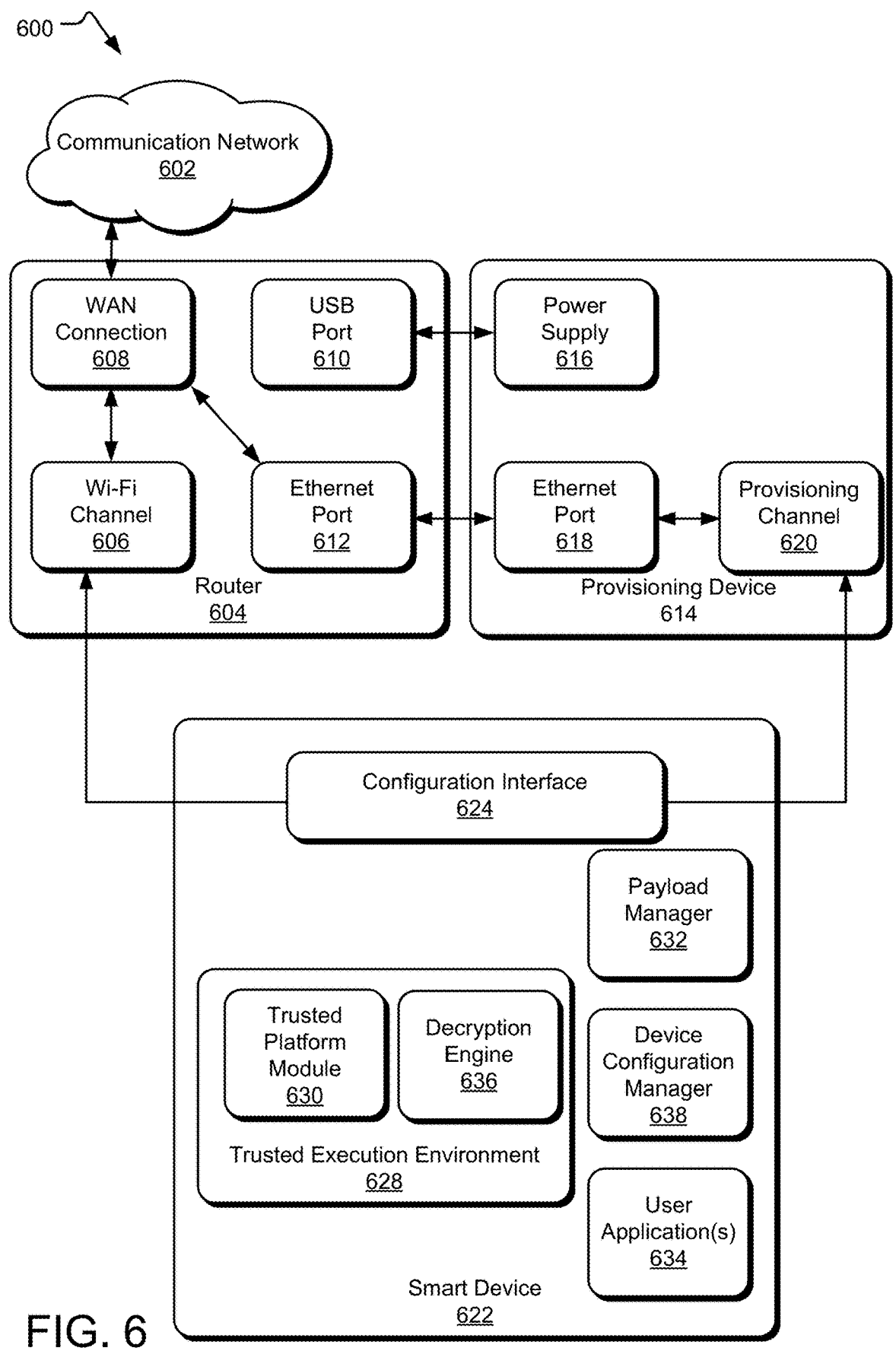
FIG. 6 illustrates an example block diagram for a provisioning device and a smart device.

FIG. 6 illustrates a block diagram 600 for a provisioning device 614 and a smart device 622. The block diagram includes a communication network 602, which includes various network components including, but not limited to, internet service network (ISP) components (e.g., edge servers), mobile communication network components, etc. A router 604 is communicatively connected to the communication network 602 via a wide area network (WAN) connector 608. The router 604 further includes a Wi-Fi channel 606, one or more universal serial bus (USB) ports (e.g., a USB port 610), one or more Ethernet ports (e.g., an Ethernet port 612). User devices, such as a laptop, mobile phone, smart TV, gaming systems etc., connect to the communication network 602 via the Wi-Fi channel 606 or the Ethernet port.

Furthermore, smart devices, such as a smart device 622 and other appliances, may connect to the communication network 602 using the Ethernet port 612 and/or the Wi-Fi channel 606. Such devices that connect to the Wi-Fi channel 606 are configured with the Wi-Fi channel 606 information (e.g., SSID and password) for connecting to the Wi-Fi channel 606. To configure a device to connect to the Wi-Fi channel a customer generally uses a display/user interface on the device to enter the SSID/password information for the Wi-Fi channel 606.

In FIG. 6 the router 604 also includes the provisioning device 614. The provisioning device 614 may be a component of the router 604 or may be a separate device that is communicatively connected to the router 604. For example, the provisioning device 614 may be a dongle that has a power supply 616 that connects to the USB port 610 of the router for power. Furthermore, the provisioning device 614 may also include an Ethernet port 618 that is communicatively connected (e.g., via an Ethernet cable) to the Ethernet port 612 of the router 604. It implementations where the provisioning device 614 is a component of the router, the provisioning device 614 may not include the power supply 616 or the Ethernet port 618 and may utilize such functionality within the router 604.

The provisioning device 614 includes a provisioning channel 620. The provisioning channel 620 may be a hidden wireless network channel or wired channel that is accessible by devices that a configured with information for the provisioning channel 620. For example, when devices, such as the smart device 622, are manufactured, information about the provisioning channel 620 may be programmed/loaded into a memory within the device. Accordingly, the provisioning channel information may be the same throughout provisioning devices.

The provisioning channel 620 is utilized by smart devices, such as the smart device 622, to initially connected to one or more provisioning services (not shown). As such, the provisioning channel 620 is constrained to one or more destinations (e.g., provisioning services). In other words, the provisioning channel 620 is preconfigured to connect to the provisioning service via the communication network 602. The provisioning channel 620 may be constrained in other ways for security reasons. For example, the provisioning channel 620 may be configured to "ping" a provisioning service once per minute or hour, for example. The provisioning channel 620 may also be constrained in speed or bandwidth. Accordingly, any nefarious actors may be deterred from using the provisioning channel 620 to gain unauthorized access to a device, a provisioning service, a router, etc. For example, if a nefarious actor attempts to utilize the provisioning channel to connect to the provisioning service many times in a short period, the provisioning service may be alerted to such unusual and unauthorized activity. As such, the provisioning service may take corrective action with the device, such as wiping/bricking the device. Furthermore, because the provisioning channel 620 is constrained in bandwidth, any attempted utilization of the provisioning channel 620 for unauthorized actions may be deterred by the slow speed.

Identification and connection information (e.g., SSID and password information) for the provisioning channel 620 is preloaded in a memory (not shown) of the smart device 622. When the smart device 622 is powered on for the first time at a customer's residence (or elsewhere), a configuration interface 624 of the smart device 622 utilizes the identification and connection information for the provisioning channel 620 to connect to the provisioning channel 620. The configuration interface 624 communicates the public key associated with the smart device 622 to a provisioning service via the provisioning channel 620 and according to the implemented constraints (e.g., once in an hour). In response, the provisioning service returns an encrypted configuration payload to a payload manager 632 of the smart device 622 via the provisioning channel 620. The configuration payload is encrypted using the public key associated with the smart device 622. Accordingly, a decryption engine 636 of the smart device 622 utilizes the cryptographically associated private key to decrypt the received configuration payload. The configuration payload includes a LAN connection parameters (e.g., SSID and password) for the Wi-Fi channel 606. Accordingly, a device configuration manager 623 of smart device 622 utilizes the LAN connection parameters to connect the smart device 622 the Wi-Fi channel 606. The smart device 622 then communicates with the provisioning service through the Wi-Fi channel 606 to send/receive larger amounts of data (relative to data sent through the constrained provisioning channel 620). Because the smart device 622 connects to the Wi-Fi channel 606 using the encrypted configuration payload, the smart device 622 implicitly confirms its identity (e.g., public/private key pair) to the provisioning service. The smart device 622 can then use the Wi-Fi channel 606 to download applications, software/firmware updates, send/receive customer data, etc. In some example implementations, the smart device 622 periodically reconnects to the provisioning channel 620 and the provisioning service to reconfirm the identity, download new configuration payloads, etc. Accordingly, the provisioning channel periodically confirms and document authorization and identity of a customer and/or devices.

The private key cryptographically associated with the public key is securely stored in a trusted platform module 630 executed in the trusted execution environment 628 of the device. A decryption engine 636 utilizes the private key stored in the trusted platform module 630 to decrypt the received configuration payload. The trusted execution environment 628 is embodied in processor-executable instructions stored in a read only memory (ROM) of the smart device 622. Thus, the trusted execution environment 628 is securely shielded from unauthorized access/updates.

In some example implementations, the provisioning channel 620 may be utilized by the smart device 622 for receiving limited amounts and/or types data. For example, the provisioning channel 620 may be configured with a current time/clock information such that he smart device 622 is synced with other devices and networks. Furthermore, it is contemplated that the provisioning channel 620 may transmit stock ticker information to the smart device 622 (e.g., if the smart device is a smart mirror, the smart mirror can display the stock ticker information). Other limited data examples are contemplated. In such implementations, the provisioning device 614 may include a plurality of different provisioning channels, each limited to a particular server/destination (e.g., a clock server, a provisioning server, a stock ticker server).

Figure 7:
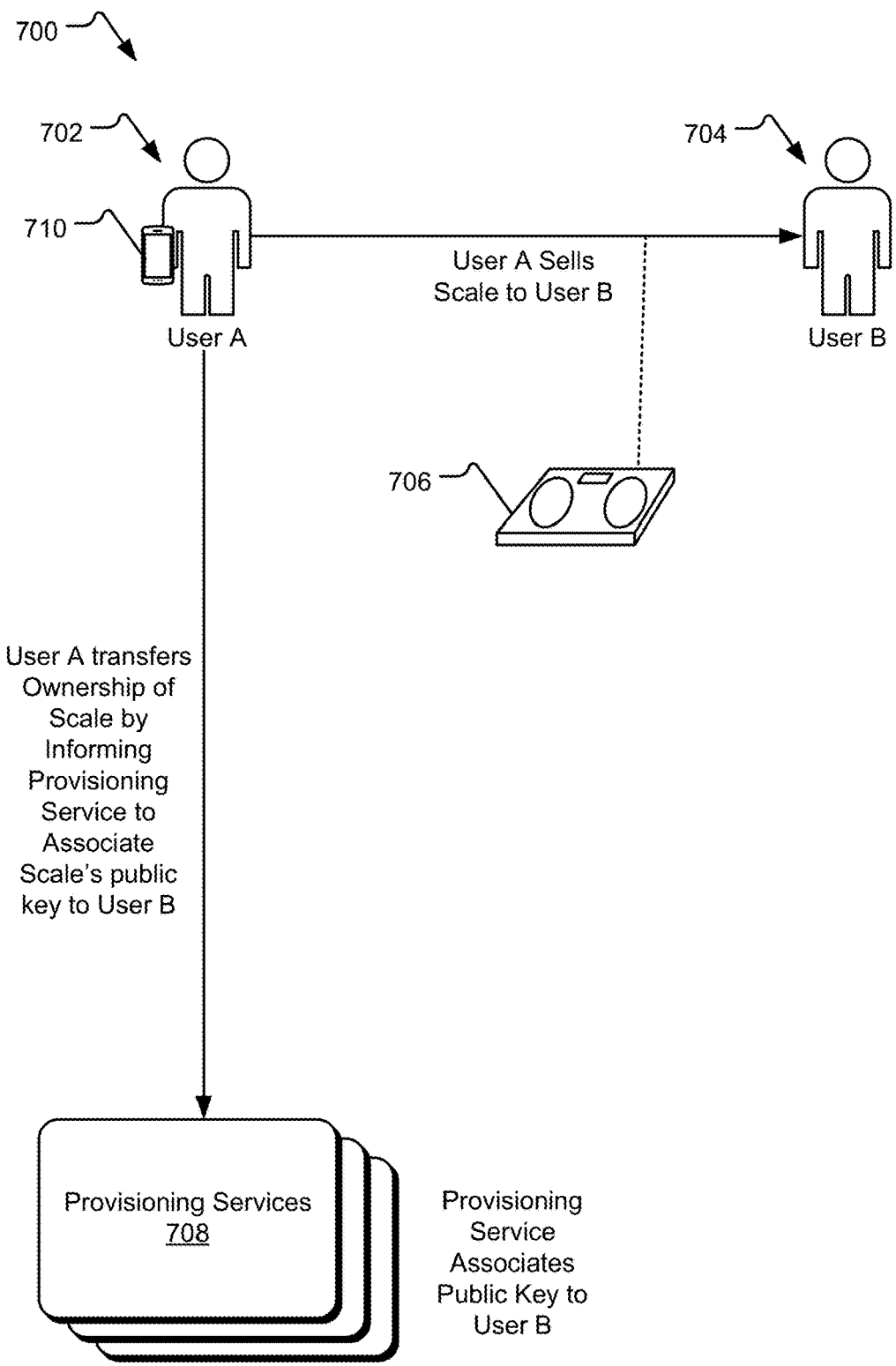
FIG. 7 illustrates an example block diagram for deprovisioning and reprovisioning a device

FIG. 7 illustrates an example block diagram 700 for deprovisioning and reprovisioning a device. The block diagram 700 includes a user A 702, who is selling a smart scale 706 to a user B 704. To transfer ownership of the smart scale 706 to the user B 704, the user A 702 utilizes a device 710 (e.g., a mobile device, laptop, desktop) to inform a provisioning service 708 to associate the public key of the smart scale 706 to the user B. The user A 702 may utilize a dedicated provisioning application, application for a manufacturer of the smart scale 706, or a vendor application to transfer ownership. The user A 702 may input identifying information about the user B 704 (e.g., a phone number, email address) into the application to transfer the ownership. In some implementations, the user A 702 instructs the vendor (e.g., in person or online) to transfer ownership to the User B 704. When the user A 702 informs the provisioning service 708 to re-associate the public key, the user A 702 is, in effect, deprovisioning and reprovisioning the device. The provisioning service 708 transfers ownership to the user B 704 by associating the public key of the smart scale 706 to the user B 704 (e.g., user B's account). In some implementations, the provisioning service 708 authorizes the user A 702 and/or the user B 704 before transferring ownership. Such authorization may include asking for username and/or password for the provisioning service, receiving a private key signed certificate from the smart scale 706, etc.

It should be understood that similar implementations may be used to "deprovision" a smart device such that ownership of the device is not associated with a particular user or party. For example, the user A 702 may wish to sell the smart scale 706 in a yard sale, but the user A 702 has no knowledge of the potential buyer. Accordingly, the user A 702 can elect to "deprovision" the smart scale 706 using the device 710. The provisioning service 708 disassociates the public key from the user A 702 and instructs the smart scale 706 to erase in data associated with the user A 702. Accordingly, the smart scale 706 is in an unclaimed or owned state. Any subsequent user may provision the smart scale 706 for themselves.

Figure 8:
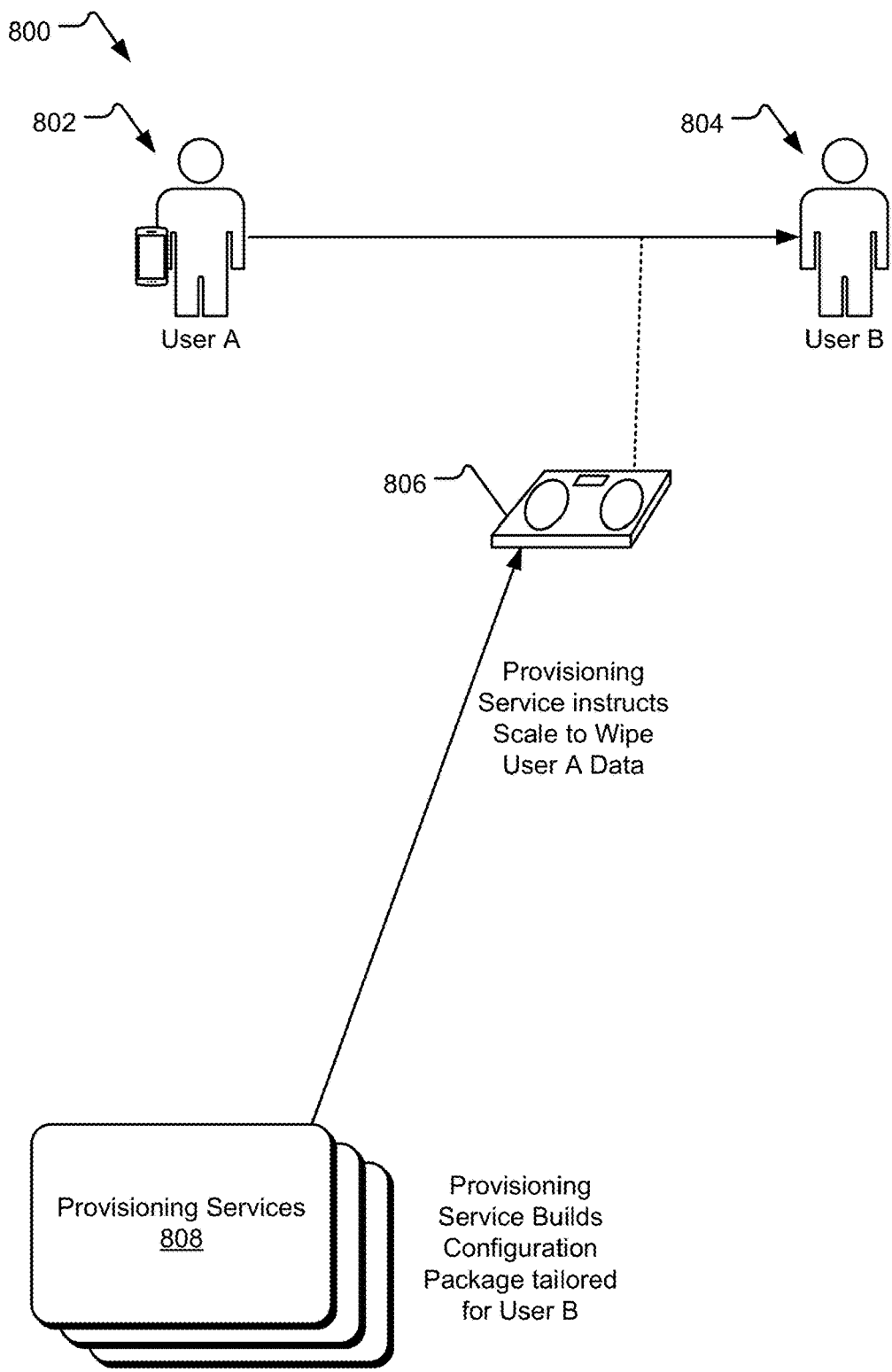
FIG. 8 illustrates another example block diagram for deprovisioning and reprovisioning a device

FIG. 8 illustrates another example block diagram 800 for deprovisioning and reprovisioning a device. The block diagram 800 includes a user A 802, who is selling a smart scale 806 to a user B 804. To transfer ownership of the smart scale 806 to the user B 804, the user A 802 utilizes a device (e.g., a mobile device, laptop, desktop) to inform a provisioning service 808 to associate the public key of the smart scale 806 to the user B 804. In response, the provisioning service 808 instructs the smart scale 806 to wipe/delete any user data and configuration information associated with the user A 802. The provisioning service 808 may further instruct the smart scale 806 to delete any software/firmware updates and applications downloaded to the smart scale 806 in association with the user A 802. If the smart scale 806 has already been disconnected (e.g., not connected to a network), then the smart scale 806 receives such instructions when it is powered on. The provisioning service 808 pre-prepares a configuration payload tailored for the user B 804. The configuration payload may be tailored based on a profile associated with the user B 804 that the provisioning service 808 manages or has access to. The profile may include the User B's SSID/password for a Wi-Fi channel in the user B's residence. As such, the configuration payload may include the SSID/password information for the user B 804.

In some situations, different users may utilize different provisioning services for device provisioning. For example, the user A 802 utilizes a vendor A provisioning service, and user B 804 utilizes vendor B provisioning service. As such, each of the provisioning services may be configured to share a database of public keys to track ownership of devices. In some example implementations, the provisioning services share a blockchain (e.g., distributed database). When the user A 802 sells the smart scale to the user B 804, the user A informs the user A provisioning service of the transfer to user B. The vendor A provisioning service records the transaction to the shared blockchain. The transaction may include identifying information for user B (e.g., a public key provisioned for the user B 804, email, phone number, etc.). Because the vendor B provisioning service has access to the shared blockchain, the vendor B provisioning service is alerted to the transaction (e.g., because it includes information regarding the user B 804, who is registered with the vendor B provisioning service). Thus, the vendor B provisioning service pre-pares a configuration payload for the user B 804. Similarly, the users themselves may record the transaction to the blockchain, which may alert both provisioning services to the transaction. Similar processes may be utilized in a data store, database, etc. storing public key ownership information and linked or stored associated with customer accounts with configuration data.

Figure 9:
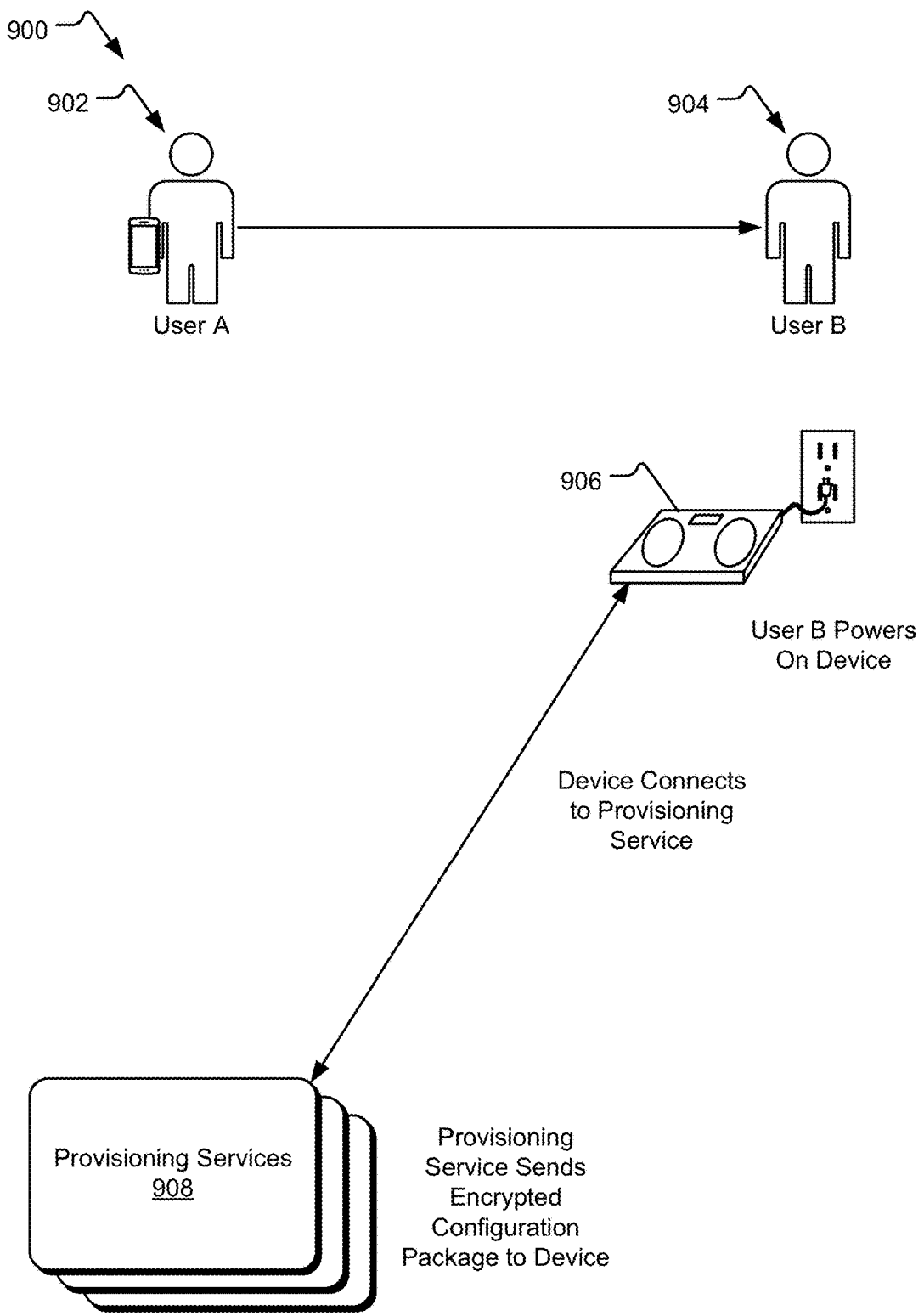
FIG. 9 illustrates another example block diagram for deprovisioning and reprovisioning a device.

FIG. 9 illustrates another example block diagram 900 for deprovisioning and reprovisioning a device. The block diagram 900 includes a user A 902, who is selling a smart scale 906 to a user B 904. To transfer ownership of the smart scale 906 to the user B 904, the user A 902 utilizes a device (e.g., a mobile device, laptop, desktop) to inform a provisioning service 708 to associate the public key of the smart scale 906 to the user B 904. The user B 904 powers on the smart scale 906. In some example implementations, the smart scale 906 connects to a IoT provisioning channel. In some example implementations, the user B 904 configures the smart scale 906 to connect to a Wi-Fi channel. The smart scale 906 connects to the provisioning service 908 (e.g., via Wi-Fi or provisioning channel), a communicates the public key associated with the smart scale to the provisioning service 908. In response, the provisioning service send encrypted configuration payload to the smart scale 906. The encrypted configuration information may include SSID/password for a Wi-Fi channel of the user B 904, software/firmware updates, applications, user data, etc. Because the smart scale 906 has access to the private key associated with the public key use to encrypt the configuration payload, the smart scale 906 decrypts and installs the configuration information. Furthermore, because the smart scale 906 is able to decrypt the configuration payload, the smart scale 906 implicitly confirms the identity of the smart scale 906.

Figure 10:
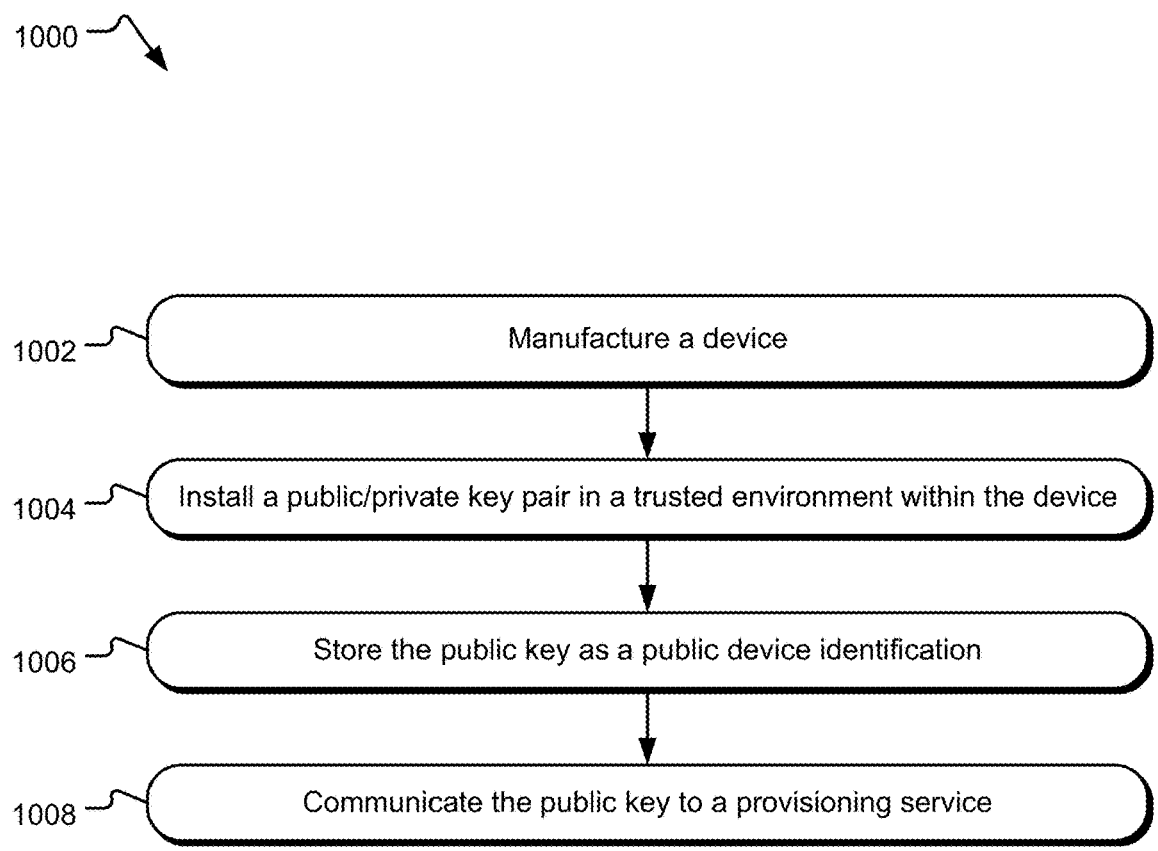
FIG. 10 illustrates example operations for manufacturing and initializing a device for provisioning.

FIG. 10 illustrates example operations 1000 for manufacturing and initializing a device for provisioning. A manufacturing 1002 operation manufactures a device. An installing operation 1004 installs a public/private key pair in a trusted environment within the device. The trusted environment may be a trusted execution environment (TEE) or a trusted platform module (TPM). Such installation may include directing the device to generate/authenticate the public/private key pair based on a seed value, etc. The private key is stored in a secure location and may be further secured by one or more policies for a TPM. A storing operation 1006 stores the public key as a public device identification (ID) for the device. A communicating operation 1008 communicates the public device identification to a provisioning service. Such communication may include an indication to associate ownership of the device (e.g., via the public key) to the manufacturer. The communicating operation 1008 may occur after a vendor purchases a device, and as such, the communication may indicate to associate the public key to the vendor (e.g., record ownership transaction).

Figure 11:
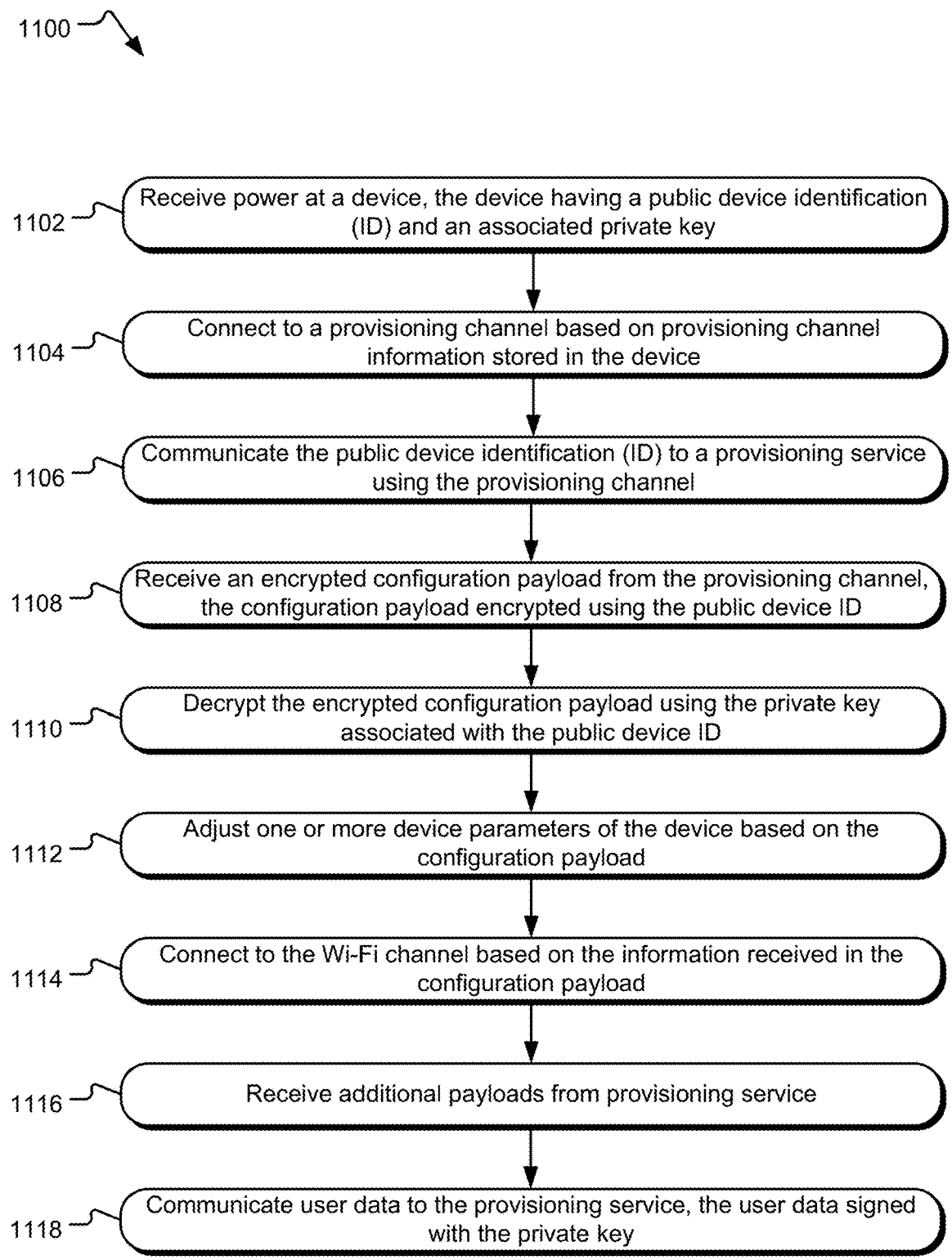
FIG. 11 illustrates example operations for provisioning a device.

FIG. 11 illustrates example operations 1100 for provisioning a device. The device has been purchased by a user and includes a public/private key pair. The public key is utilized a public device identification (ID). The private key is stored in a trusted portion of the device, such as a trusted platform module (TPM). A receiving operation 1102 receives power at the device. A connecting operation 1104 connects to a provisioning channel based on provisioning channel information stored in the device. The provisioning channel information (e.g., ID) may be installed in the device when the device is manufactured. A communicating operation 1106 communicates the public device ID to a provisioning service using the provisioning channel. The provisioning service has previously associated the public device ID to the user of the device based on a recorded transaction involving the user (e.g., the user purchased the device from the vendor).

A receiving operation 1108 receives an encrypted configuration payload from the provisioning channel. The encrypted configuration payload is encrypted using the public device ID. The provisioning channel prepares the configuration payload according to user account information that is now associated with the public ID. The configuration payload is tailored for the user based on the profile information and may include Wi-Fi information for connecting the user's personal Wi-Fi channel. A decrypting operation 1110 decrypts the encrypted configuration payload using the private key associated with the public device ID. An adjusting operation 1112 adjusts one or more device parameters based on the configuration payload. In some implementations, the configuration payload includes information (e.g., SSID/password) information for connecting to the user's Wi-Fi channel. As such, device parameters may include a Wi-Fi connecting SSID and password for connecting to the Wi-Fi Channel In some example implementations, the user configures the device by inputting the Wi-Fi information into the device (e.g., via a connected computing device or user interface in the device). A connecting operation 1114 connects to the Wi-Fi channel based on the information received in the configuration payload. A receiving operation 1116 receives additional payloads from the provisioning service. Such additional payloads may be encrypted using the public device ID. A communicating operation 1118 communicates user data to the provisioning service. Such data may be encrypted and signed using the private key associated with device's public key. As such, the provisioning service can verify that the user data is received from the device.

Figure 12:
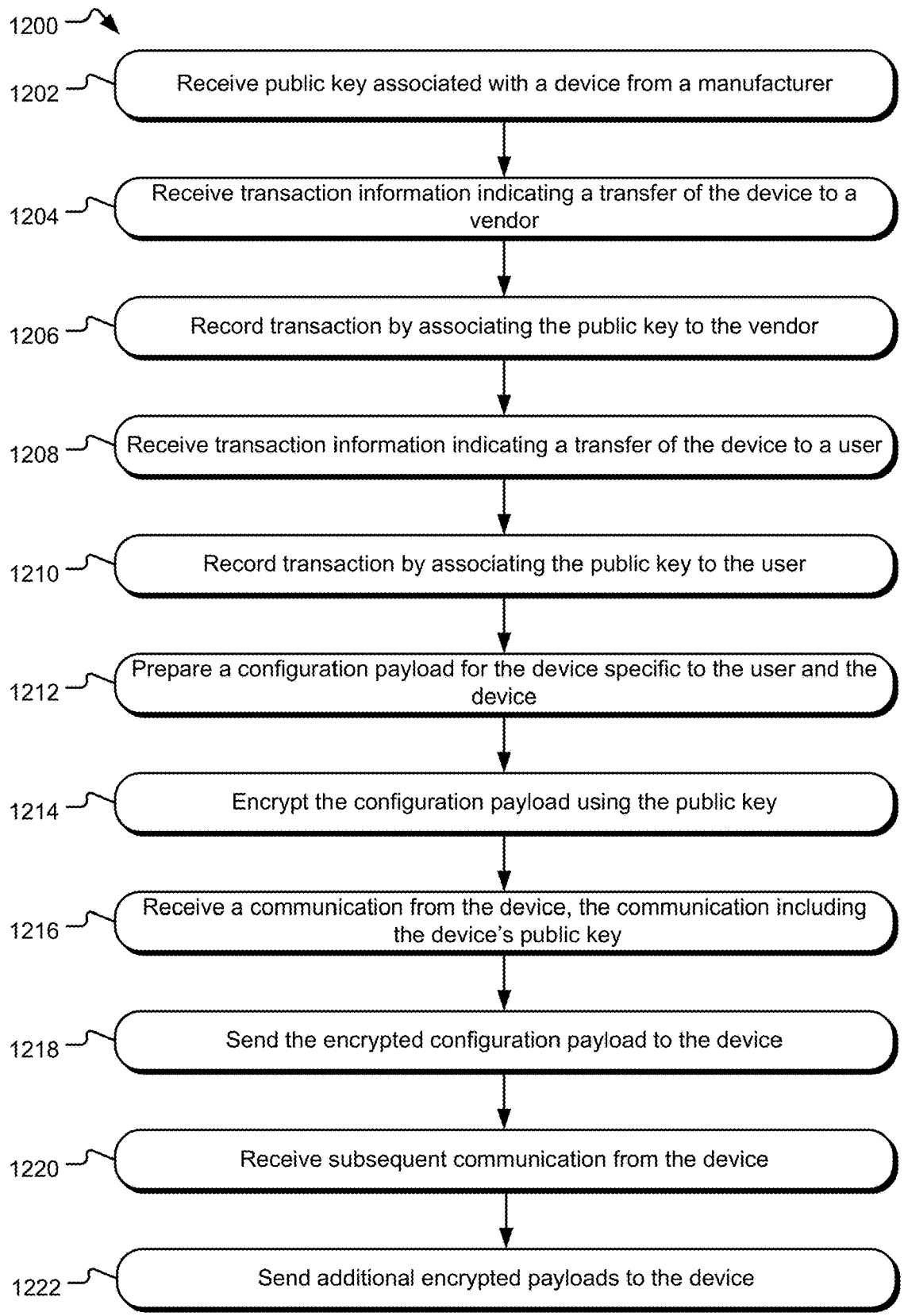
FIG. 12 illustrates example operations for provisioning a device.

FIG. 12 illustrates example operations 1200 for provisioning a device. Specifically, FIG. 12 illustrates device provisioning from the perspective of a provisioning service. A receiving operation 1202 receives a public key associated with a device from a manufacturer. The manufacturer has manufactured the device and installed a public/private key pair in the device and stored the public key as a public device identification (ID). A receiving operation 1204 receives transaction information indicating a transfer of the device to a vendor. The transaction includes the public key (public device ID) and the receiving party (e.g., the vendor). A recording operation 1206 records the transaction by associating the public key to the vendor. Another receiving operation 1208 receives transaction information indicating a transfer of the device to a user. Another recording operation 1210 records the transaction by associating the public key to the user. The user may have an associated customer profile managed by the provisioning service or accessible by the provisioning service. Accordingly, a preparing operation 1212 prepares a configured payload for the device specific to the user (e.g., customer) and the device. The configuration payload may include the user's Wi-Fi information (e.g., SSID/password) for connecting to the user's Wi-Fi. An encrypting operation 1214 encrypts the configuration payload using the public key associated with the device.

A receiving operation 1216 receives a communication from the device. The communication may include the devices public key (or may include data signed by the private key associated with the public key). The communication may be received via a constrained provisioning channel. The provisioning service determines that the received public key (e.g., the public device ID) matches a public device ID stored ownership record accessible by the provisioning service. Furthermore, one or more device configuration parameters may be stored in association with the ownership record (e.g., in connection with a user/customer account). The one or more device configuration parameters may be stored in the ownership record itself, stored in the user account in another location and linked to the ownership record, etc. A sending operation 1218 sends the encrypted configuration payload to the device. If the public device ID is not stored in the ownership record or is not confirmed to be associated with a user or customer, then the provisioning service does not send the encrypted configuration payload and may take corrective action because the device may be stolen. A receiving operation 1220 receives subsequent communication from the device. The receiving operation 1220 may be received over an un-constrained channel. The subsequent communications may be signed by the device's private key. A sending operation 1222 sends additional encrypted payloads to the device. The additional payloads may include software/firmware updates, applications, user data, etc.

Figure 13:
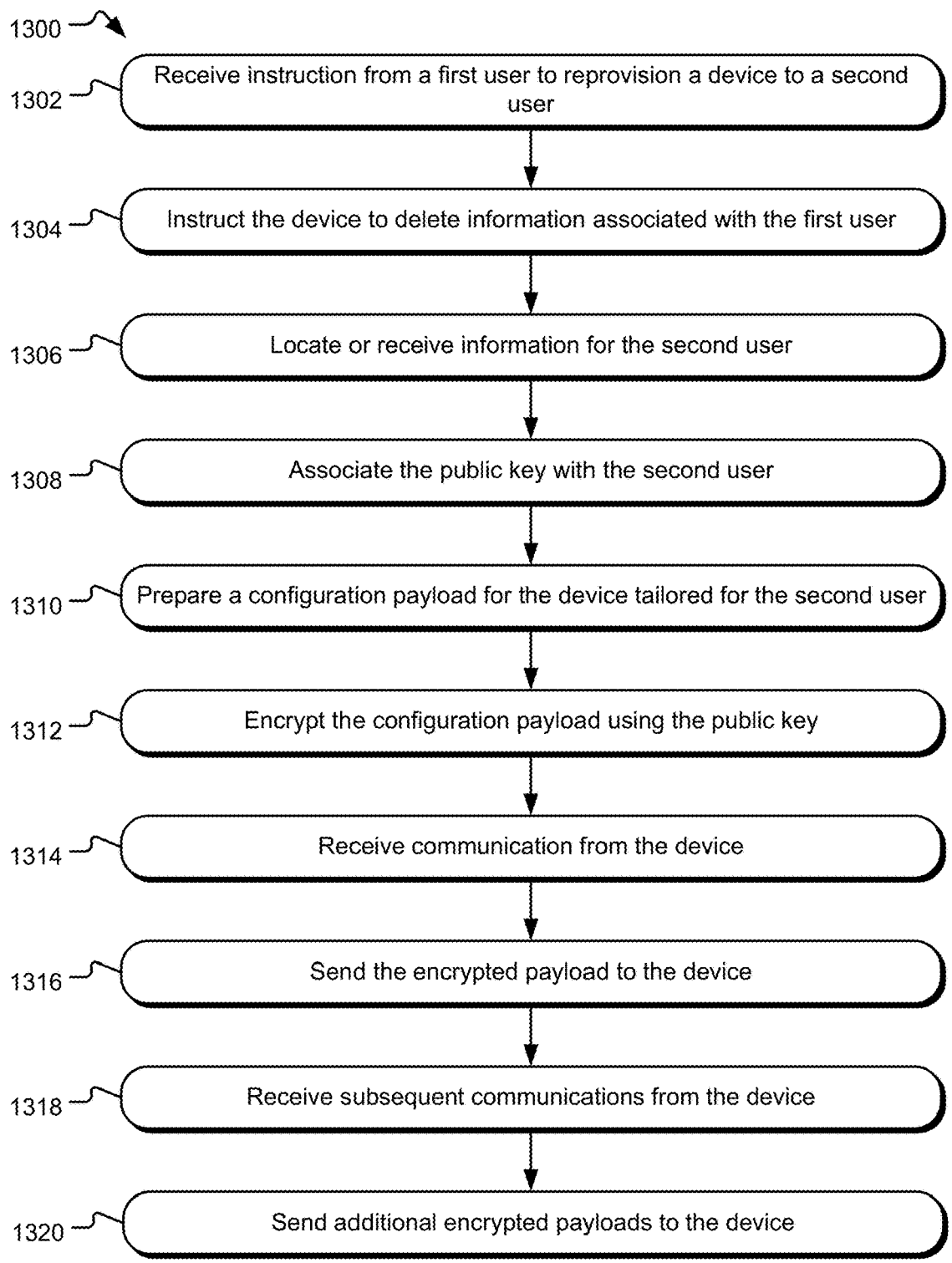
FIG. 13 illustrates example operations for deprovisioning and reprovisioning a device.

FIG. 13 illustrates example operations 1300 for deprovisioning and reprovisioning a device. A receiving operation 1302 receives instruction from a first user to reprovisioning a device to a second user. The device has a public key (a public device identification (ID)) and a private key. An instructing operation 1304 instructs the device to delete information associated with the first user. Such information may include Wi-Fi information, applications, user data, software updates, etc. If the device is offline, the instruction will be sent when the device is online. A locating operation 1306 locates or receives information for the second user. The first user may utilize an application or website to send the second user's information (e.g., phone number, email, etc.) to the provisioning service. If the second user does not have an account with (or accessible by) the provisioning service, the second user may be instructed to register with the provisioning service.

An associating operation 1308 associates the public key with the second user. The associating operation 1308 effectively records the transaction between the first user and the second user and transfers ownership of the device from the first user to the second user. A preparing operation 1310 prepares a configuration payload for the deice tailored for the second user. The configuration payload may include the second user's Wi-Fi information that is associated with the second user's account. An encrypting operation 1312 encrypts the payload using the public key. A receiving operation 1314 receives a communication from the device. The communication includes the device's public key or includes data signed by the device's private key, effectively confirming the data is received from the device and that the device is connected to the network. A sending operation 1316 sends the encrypted payload to the device. A receiving operation 1318 receives subsequent communications from the device. The subsequent communications may include user data signed by the device's private key. A sending operation 1320 sends additional encrypted payloads to the device, which may include user data, applications, software/firmware updates, etc.

Figure 14:
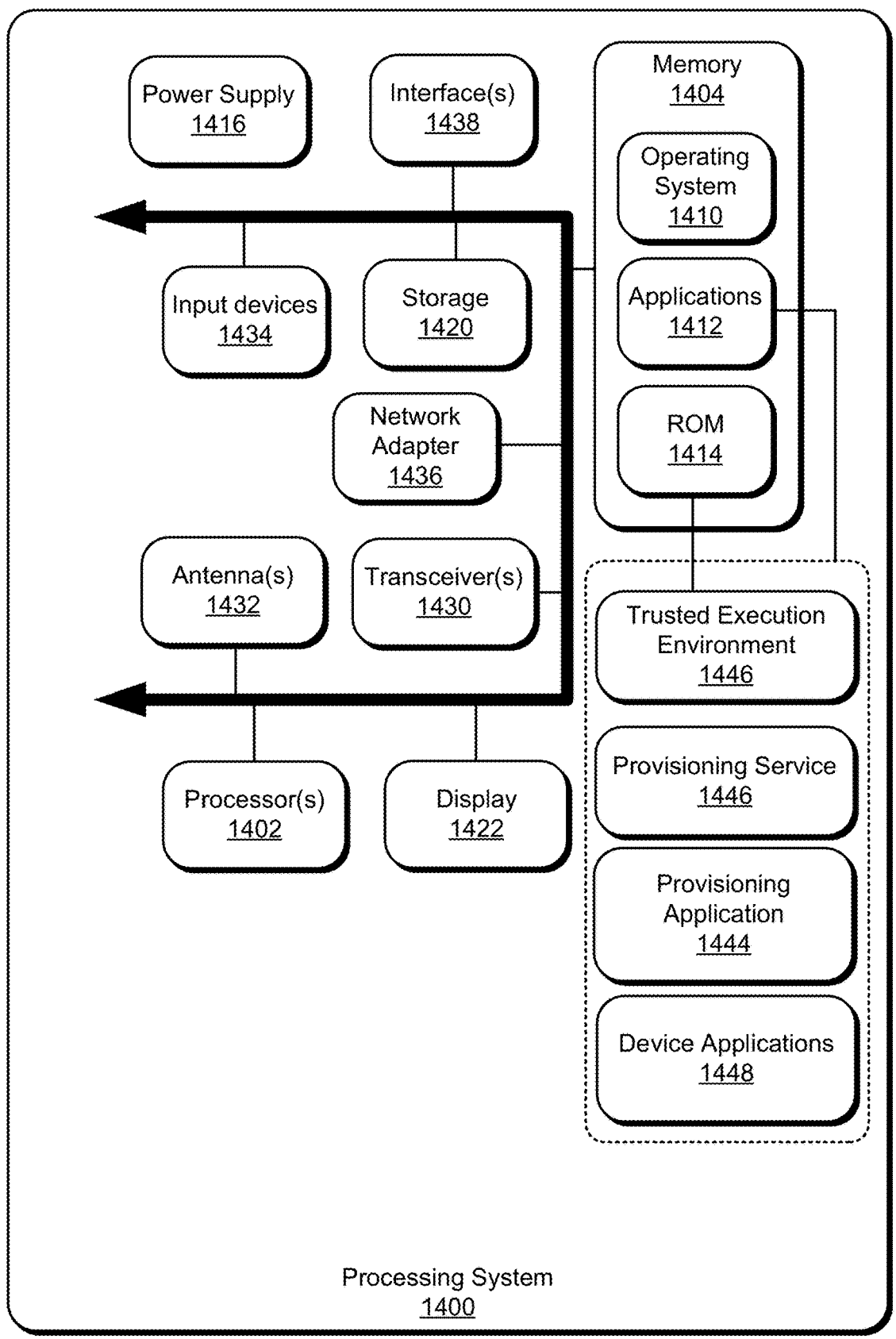
FIG. 14 illustrates an example system that may be useful in implementing the described technology.

FIG. 14 illustrates an example system (labeled as a processing system 1400) that may be useful in implementing the described technology. The processing system 1400 may be a client device, such as a laptop, mobile device, desktop, tablet, or a server/cloud device, such as a server for a provisioning service. The processing system 1400 includes one or more processor(s) 1402, and a memory 1404. The memory 1404 generally includes both volatile memory (e.g., RAM) and non-volatile memory (e.g., flash memory). An operating system 1410 resides in the memory 1404 and is executed by the processor 1402. The memory 1404 includes a read only memory (ROM) 1414, which may be, in some implementations, write once, read many (WORM) memory.

One or more application programs 1412 modules or segments, such as a provisioning service 1446 (e.g., if the processing system 1400 is a server device), a provisioning application 1444 (e.g., if the processing system is a user devices, such as a mobile device), or a device application 1448 (e.g., a provisioning manager or user application) are loaded in the memory 1404 and/or storage 1420 and executed by the processor 1402. A trusted execution environment 1450 is stored in the ROM 1414 and executed by the processor 1402. Data, such as public keys (e.g., public device IDs), customer profiles, user data, encryption keys, private keys, user preferences, ownership records, etc. may be stored in the memory 1404 or storage 1420 and may be retrievable by the processor 1402 for use in the by the provisioning service 1446, the provisioning application 1444, or the device application 1448, etc. The storage 1420 may be local to the processing system 1400 or may be remote and communicatively connected to the processing system 1400 and may include another server. The storage 1420 may store resources that are requestable by client devices (not shown).

The processing system 1400 includes a power supply 1416, which is powered by one or more batteries or other power sources and which provides power to other components of the processing system 1400. The power supply 1416 may also be connected to an external power source that overrides or recharges the built-in batteries or other power sources.

The processing system 1400 may include one or more communication transceivers 1430 which may be connected to one or more antenna(s) 1432 to provide network connectivity (e.g., mobile phone network, Wi-Fi®, Bluetooth®, etc.) to one or more other servers and/or client devices (e.g., mobile devices, desktop computers, or laptop computers). The processing system 1400 may further include a network adapter 1436, which is a type of communication device. The processing system 1400 may use the network adapter 1436 and any other types of communication devices for establishing connections over a wide-area network (WAN) or local-area network (LAN). It should be appreciated that the network connections shown are exemplary and that other communications devices and means for establishing a communications link between the processing system 1400 and other devices may be used.

The processing system 1400 may include one or more input devices 1434 such that a user may enter commands and information (e.g., a keyboard or mouse). These and other input devices may be coupled to the server by one or more interfaces 1438, such as a serial port interface, parallel port, universal serial bus (USB), etc. The processing system 1400 may further include a display 1422, such as a touch screen display.

The processing system 1400 may include a variety of tangible processor-readable storage media and intangible processor-readable communication signals. Tangible processor-readable storage can be embodied by any available media that can be accessed by the processing system 1400 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information, such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1400. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media, such as a wired network or direct-wired connection, and wireless media, such as acoustic, RF, infrared, and other wireless media.

In at least one implementation, an example device includes one or more processors, a configuration interface executable by the one or more processors, a payload manager executable by the one or more processors, a decryption engine executable by the one or more processors, and a device configuration manager executable by the one or more processors. The configuration interface is configured to communicate a public device ID to a provisioning service. The public device ID is cryptographically associated with a private key securely stored in the device. A user is identified as owner of the device based on an ownership record and the public device ID. One or more device configuration parameters specific to the user and the device are stored in association with the ownership record. The payload manager is configured to receive an encrypted configuration payload from the provisioning service, the configuration payload containing the one or more device configuration parameters specific to the user and the device. The encrypted configuration payload is encrypted using the public device ID cryptographically associated with the private key securely stored in the device. The decryption engine is configured to decrypt the encrypted configuration payload using the private key securely stored on the device and cryptographically associated with the public device ID communicated to the provisioning service. The device configuration manager is configured to configure the device according to the one or more device configuration parameters received in the configuration payload.

Another example device of any preceding device includes the public device ID being communicated to the provisioning service via a provisioning channel, and the encrypted configuration payload is received via the provisioning channel. The provisioning channel is configured to communicate with a predefined selection of destinations.

Another example device of any preceding device includes the configuration interface being further configured to, upon receiving power at the device, communicatively connect to a provisioning channel associated with a provisioning channel ID stored on the device prior to receiving the power at the device. The public device ID is communicated via the provisioning channel, and the encrypted configuration payload is received via the provisioning channel.

Another example device of any preceding device includes the encrypted configuration payload received via the provisioning channel includes local area network (LAN) connection parameters for connecting to a LAN. The configuration interface is further configured to communicatively connect to the LAN using the LAN parameters received in the encrypted configuration payload.

Another example device of any preceding device includes the encrypted configuration payload received via the provisioning channel includes local area network (LAN) connection parameters for connecting to a LAN. The configuration interface is further configured to communicatively connect to the LAN using the LAN parameters received in the encrypted configuration payload. The payload manager is further configured to receive an additional configuration payload from the provisioning service via the LAN, the additional configuration payload containing additional one or more device parameters specific to the user and the device stored in associated with in the ownership record.

Another example device of any preceding device includes the configuration manager being further configured to limit functionality of the device based on the encrypted configuration payload received from the provisioning service.

An example method includes communicating a public device ID to a provisioning service from the device. The public device ID is cryptographically associated with a private key securely stored in the device. A user is identified as owner of the device based on an ownership record and the public device ID. One or more device configuration parameters specific to the user and the device are stored in association with the ownership record. The method further includes receiving, at the device from the provisioning service, an encrypted configuration payload containing the one or more device configuration parameters. The encrypted configuration payload is encrypted using the public device ID cryptographically associated with the private key securely stored in the device. The method further includes decrypting, on the device, the encrypted configuration payload using the private key securely stored on the device and cryptographically associated with the public device ID communicated to the provisioning service. The method further includes configuring the device according to the one or more device configuration parameters received in the configuration payload.

Another example method of any preceding method includes the public device ID being communicated to the provisioning service via a provisioning channel, and the encrypted configuration payload being received via the provisioning channel. The provisioning channel is configured to communicate with a predefined selection of destinations.

Another example method of any preceding method includes receiving power at the device, a provisioning channel ID stored on the device prior to receiving the power at the device, and communicatively connecting to a provisioning channel associated with the provisioning channel ID. The public device ID is communicated via the provisioning channel, and the encrypted configuration payload is received via the provisioning channel.

Another example method of any preceding method includes the encrypted configuration payload received via the provisioning channel including local area network (LAN) connection parameters for connecting to a LAN. The method further includes communicatively connecting to the LAN using the LAN connection parameters received in the encrypted configuration payload and receiving an additional configuration payload from the provisioning service via the LAN. The additional configuration payload contains one or more additional device parameters specific to the user and the device stored in association with the ownership record.

Another example method of any preceding method includes functionality of the device being limited based on the encrypted configuration payload received from the provisioning service.

Another example method of any preceding method includes the public device ID being a public key cryptographically associated with the private key as a public/private key pair.

Another example method of any preceding method includes the provisioning service identifying the user as the owner of the device based on a determination of whether a public device ID stored in the ownership record matches the public device ID communicated by the device.

An example device includes means for communicating a public device ID to a provisioning service from the device. The means supporting the public device ID being cryptographically associated with a private key securely stored in the device. A user is identified as owner of the device based on an ownership record and the public device ID. One or more device configuration parameters specific to the user and the device are stored in association with the ownership record. The device further includes means for receiving, at the device from the provisioning service, an encrypted configuration payload containing the one or more device configuration parameters. The encrypted configuration payload is encrypted using the public device ID cryptographically associated with the private key securely stored in the device. The device further includes means for decrypting, on the device, the encrypted configuration payload using the private key securely stored on the device and cryptographically associated with the public device ID communicated to the provisioning service. The device further includes means for configuring the device according to the one or more device configuration parameters received in the configuration payload.

Another example device of any preceding device further includes means for the public device ID being communicated to the provisioning service via a provisioning channel, and the encrypted configuration payload being received via the provisioning channel. The provisioning channel is configured to communicate with a predefined selection of destinations.

Another example device of any preceding device further includes means for receiving power at the device, a provisioning channel ID stored on the device prior to receiving the power at the device, and means for communicatively connecting to a provisioning channel associated with the provisioning channel ID. The public device ID is communicated via the provisioning channel, and the encrypted configuration payload is received via the provisioning channel.

Another example device of any preceding device further includes means for the encrypted configuration payload received via the provisioning channel including local area network (LAN) connection parameters for connecting to a LAN. The device includes means for communicatively connecting to the LAN using the LAN connection parameters received in the encrypted configuration payload and means for receiving an additional configuration payload from the provisioning service via the LAN. The additional configuration payload contains one or more additional device parameters specific to the user and the device stored in association with the ownership record.

Another example device of any preceding device further includes means for functionality of the device being limited based on the encrypted configuration payload received from the provisioning service.

Another example device of any preceding device further includes means for the public device ID being a public key cryptographically associated with the private key as a public/private key pair.

Another example device of any preceding device further includes means for the provisioning service identifying the user as the owner of the device based on a determination of whether a public device ID stored in the ownership record matches the public device ID communicated by the device.

One or more tangible processor-readable storage media embodied with instructions for executing on one or more processors and circuits of a device a process comprising communicating a public device ID to a provisioning service from the device. the public device ID being cryptographically associated with a private key securely stored in the device, a user being identified as owner of the device based on an ownership record and the public device ID, one or more device configuration parameters specific to the user and the device being stored in association with the ownership record. The process further comprises receiving, at the device from the provisioning service, an encrypted configuration payload containing the one or more device configuration parameters specific to the user and the device, the encrypted configuration payload further being encrypted using the public device ID cryptographically associated with the private key securely stored in the device. The process further comprises decrypting, on the device, the encrypted configuration payload using the private key securely stored on the device and cryptographically associated with the public device ID communicated to the provisioning service. The computer further comprises configuring the device according to the one or more device configuration parameters received in the configuration payload.

Another example tangible processor-readable storage media embodied with instructions for executing on one or more processors and circuits of a device a process of any preceding process further includes the public device ID being communicated to the provisioning service via a provisioning channel and the encrypted configuration payload is received via the provisioning channel, the provisioning channel being configured to communicate with a predefined selection of destinations.

Another example tangible processor-readable storage media embodied with instructions for executing on one or more processors and circuits of a device a process of any preceding process further includes receiving power at the device, a provisioning channel ID stored on the device prior to receiving the power at the device, and communicatively connecting to a provisioning channel associated with the provisioning channel ID, the public device ID is communicated via a provisioning channel and the encrypted configuration payload is received via the provisioning channel.

Another example tangible processor-readable storage media embodied with instructions for executing on one or more processors and circuits of a device a process of any preceding process further includes the encrypted configuration payload being received via the provisioning channel includes local area network (LAN) connection parameters. The process further includes communicatively connecting to the LAN using the LAN connection parameters received in the encrypted configuration payload, and receiving an additional configuration payload from the provisioning service via the LAN, the additional configuration payload containing one or more additional device parameters specific to the user and the device stored in association with the ownership record.

Another example tangible processor-readable storage media embodied with instructions for executing on one or more processors and circuits of a device a process of any preceding process further includes the provisioning service identifying the user as the owner of the device based on a determination of whether a public device ID stored in the ownership record matches the public device ID communicated by the device.

Another example tangible processor-readable storage media embodied with instructions for executing on one or more processors and circuits of a device a process of any preceding process further includes the public device ID is a public key cryptographically associated with the private key as a public/private key pair.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:
1. A device comprising:
  a processor;
  memory coupled to the processor and comprising computer executable instructions that, when executed by the processor, performs operations to:
    communicate a public device ID of the device to a remote provisioning service via a first communication channel of a first network accessible by a routing device co-located with the device, the public device ID being cryptographically associated with a private key securely stored in the device, a user being identified as owner of the device based on the public device ID and an ownership record storing device configuration parameters specific to the user and the device;
    receive, via the first communication channel, a configuration payload encrypted using the public device ID and containing the device configuration parameters;
    decrypt the configuration payload using the private key;
    configure the device according to the device configuration parameters, wherein configuring the device enables the device to communicate via a second communication channel of a second network accessible by the routing device, the first communication channel and the second communication channel being provided by the routing device, wherein the first communication channel:
      is constrained to be connected to the remote provisioning service;
      is constrained, compared to the second communication channel, in at least one of bandwidth or data transmission speed when connected to the remote provisioning service via the routing device; and is accessible by devices that are preconfigured with information for accessing the first communication channel; and communicate, using the second communication channel via the routing device, an information request to the provisioning service.

2. The device of claim 1 wherein the first communication channel is configured to communicate with a predefined selection of destinations.

3. The device of claim 1 wherein the configuration payload includes local area network (LAN) connection parameters for connecting to a LAN of the device, the LAN providing the second communication channel.

4. The device of claim 3, the computer executable instructions further performing operations to:

receive an additional configuration payload from the provisioning service via the LAN, the additional configuration payload containing additional device parameters specific to the user and the device.

5. The device of claim 1 wherein the provisioning service identifies the user as the owner of the device based on a determination of whether a public device ID stored in the ownership record matches the public device ID communicated by the device.

6. The device of claim 1 wherein functionality of the device is limited based on the configuration payload received from the provisioning service.

7. The device of claim 1, wherein the first communication channel is further constrained by at least one of frequency speed or data rate as compared to the second communication channel.

8. The device of claim 1, wherein:

ownership of the device is transferred to the user by associating the public device ID with the user; and if the provisioning service detects that ownership has not been transferred when the device is connected to the first communication channel, the provisioning service locks the device with an update to prevent an unauthorized party from using the device.

9. A method for provisioning a device comprising:

communicating a public device ID of the device to a provisioning service via a first communication channel of a first network provided by a routing device co-located with the device, wherein the public device ID is cryptographically associated with a private key securely stored in the device and a user is identified as owner of the device based on the public device ID and an ownership record storing device configuration parameters specific to the user and the device;

receiving, from the provisioning service via the first communication channel, a configuration payload encrypted using the public device ID and containing the device configuration parameters;

decrypting, on the device, the configuration payload using the private key;

configuring the device according to the device configuration parameters, wherein the configuring enables the device to communicate via a second communication channel of a second network accessible by the routing device, wherein the first communication channel is:
constrained to be connected to the provisioning service;
constrained, compared to the second communication channel, in at least one of bandwidth or data transmission speed when connected to the remote provisioning service via the routing device; and communicating, by the device via the second communication channel, an information request to the provisioning service.

10. The method of claim 9 wherein the first communication channel is configured to communicate with a predefined selection of destinations.

11. The method of claim 9 further comprising:

receiving power at the device, wherein a provisioning channel ID is stored on the device prior to receiving the power at the device;

configuration payload includes local area network (LAN) connection parameters for connecting to a LAN, the method further comprising:

communicatively connecting to the LAN using the LAN connection parameters received in the encrypted configuration payload, the LAN providing the second communication channel; and receiving an additional configuration payload from the provisioning service via the second communication channel, the additional configuration payload containing additional device parameters specific to the user and the device.

12. The method of claim 11 wherein the configuration payload includes local area network (LAN) connection parameters for connecting to a LAN, the method further comprising:

communicatively connecting to the LAN using the LAN connection parameters received in the encrypted configuration payload, the LAN providing the second communication channel; and receiving an additional configuration payload from the provisioning service via the second communication channel, the additional configuration payload containing additional device parameters specific to the user and the device.

13. The method of claim 9 wherein functionality of the device is limited based on the configuration payload received from the provisioning service.

14. The method of claim 9 wherein the public device ID is a public key cryptographically associated with the private key as a public/private key pair.

15. The method of claim 9 wherein the provisioning service identifies the user as the owner of the device based on a determination of whether a public device ID stored in the ownership record matches the public device ID communicated by the device.

16. The method of claim 9, if the provisioning service detects that ownership of the device has not been transferred when the device is connected to the first communication channel, the provisioning service locks the device with an update to prevent unauthorized use of the device.

17. The method of claim 9, wherein the first communication channel is a hidden channel that is accessible by devices that are preconfigured with connection information for the hidden channel.

18. One or more tangible processor-readable storage media device embodied with instructions for executing on one or more processors and circuits of a device a process comprising:

communicating a public device ID of the device to a provisioning service via a first communication channel provided by a routing device co-located with the device, the public device ID being cryptographically associated with a private key securely stored in the device, a user being identified as owner of the device based on the public device ID and an ownership record storing device configuration parameters specific to the user and the device;

receiving, from the provisioning service via the first communication channel, a configuration payload encrypted using the public device ID and containing the device configuration parameters;

decrypting, on the device, the configuration payload using the private key;

configuring, by the device, the device configuration parameters, wherein the configuring enables the device to communicate via a second communication channel provided by the routing device, wherein the first communication channel is:

constrained to be connected to the provisioning service;

constrained, as compared to the second communication channel, in at least one of frequency speed or data rate when connected to the remote provisioning service via the routing device; and communicating, by the device via the second communication channel, an information request to the provisioning service.

19. The one or more tangible processor-readable storage media device of claim 18 wherein the configuration payload received via the provisioning channel includes local area network (LAN) connection parameters, the process further comprising:

communicatively connecting to the LAN using the LAN connection parameters received in the encrypted configuration payload, the LAN providing the second communication channel; and receiving an additional configuration payload from the provisioning service via the second communication channel, the additional configuration payload containing additional device parameters specific to the user and the device.

20. The one or more tangible processor-readable storage media device of claim 18 wherein the provisioning service identifies the user as the owner of the device based on a determination of whether a public device ID stored in the ownership record matches the public device ID communicated by the device.

* * * * *